US012218545B2

(12) United States Patent
Tsuruta et al.

(10) Patent No.: US 12,218,545 B2
(45) Date of Patent: Feb. 4, 2025

(54) UNINTERRUPTIBLE POWER SUPPLY

(71) Applicant: TMEIC Corporation, Chuo-ku (JP)

(72) Inventors: Ryoji Tsuruta, Chiyoda-ku (JP); Tomohiro Tanaka, Chuo-ku (JP); Hiroshi Masunaga, Chuo-ku (JP)

(73) Assignee: TMEIC Corporation, Chuo-ku (JP)

( * ) Notice: Subject to any disclaimer, the term of this patent is extended or adjusted under 35 U.S.C. 154(b) by 0 days.

(21) Appl. No.: 18/548,683

(22) PCT Filed: Mar. 8, 2021

(86) PCT No.: PCT/JP2021/008979
§ 371 (c)(1),
(2) Date: Sep. 1, 2023

(87) PCT Pub. No.: WO2022/190167
PCT Pub. Date: Sep. 15, 2022

(65) Prior Publication Data
US 2024/0171000 A1 May 23, 2024

(51) Int. Cl.
*H02J 9/06* (2006.01)
(52) U.S. Cl.
CPC .................... *H02J 9/062* (2013.01)
(58) Field of Classification Search
CPC .............. H02J 9/062; H02J 9/06; Y04S 20/12
See application file for complete search history.

(56) References Cited

U.S. PATENT DOCUMENTS

2014/0368042 A1* 12/2014 Giuntini ................ H02J 3/1864
307/64
2016/0056667 A1 2/2016 Konishi et al.
2017/0077746 A1* 3/2017 Kanakasabai ........... H02J 9/062

FOREIGN PATENT DOCUMENTS

| JP | 2004-343826 A | 12/2004 |
|----|---------------|---------|
| JP | 2009-131122 A | 6/2009 |
| JP | 2016-46900 A | 4/2016 |
| WO | WO 2010/044164 A1 | 4/2010 |
| WO | WO 2020/026430 A1 | 2/2020 |

OTHER PUBLICATIONS

International Search Report issued May 18, 2021 in PCT/JP2021/008979, filed on Mar. 8, 2021, citing documents 1 & 17-19 therein, 2 pages.
International Preliminary Report on Patentability and Written Opinion issued on Sep. 21, 2023 in PCT/JP2021/008979 (with unedited computer-generated English translation), 14 pages.

\* cited by examiner

*Primary Examiner* — Rexford N Barnie
*Assistant Examiner* — Terrence R Willoughby
(74) *Attorney, Agent, or Firm* — Oblon, McClelland, Maier & Neustadt, L.L.P.

(57) ABSTRACT

This uninterruptible power supply includes a switch that is turned off while an AC power supply is normal and turned on during power failure, a converter that converts AC power supplied from the AC power supply into DC power to supply resultant DC power to a DC link portion while the AC power supply is normal, and that supplies DC power supplied from a battery through the switch to the DC link portion during power failure, an inverter that converts DC power from the DC link portion into AC power to supply resultant AC power to a load, and a chopper circuit that allows DC power from the DC link portion to be stored in the battery while the AC power supply is normal.

15 Claims, 19 Drawing Sheets

UNINTERRUPTIBLE POWER SUPPLY

TECHNICAL FIELD

The present disclosure relates to an uninterruptible power supply.

BACKGROUND ART

An uninterruptible power supply has widely been used for stable supply of alternating-current (AC) power to such an important load as a computer system. For example, Japanese Patent Laying-Open No. 2004-343826 (PTL 1) discloses an uninterruptible power supply including a converter, an inverter, and a chopper circuit. While an AC power supply is normal, the converter converts AC power supplied from the AC power supply into direct-current (DC) power. An inverter converts this DC power into AC power to supply resultant AC power to a load, while a chopper circuit allows this DC power to be stored in a power storage device. During power failure of the AC power supply, the chopper circuit allows DC power in the power storage device to be supplied to the inverter, and the inverter converts this DC power into AC power to supply resultant AC power to the load. Therefore, even during power failure of the AC power supply, an operation of the load can continue for a period for which there is DC power stored in the power storage device.

For example, WO2010/044164 (PTL 2) discloses an uninterruptible power supply that can achieve reduction of harmonics by configuring each of a converter, an inverter, and a chopper circuit as a three-level circuit.

CITATION LIST

Patent Literature

PTL 1: Japanese Patent Laying-Open No. 2004-343826
PTL 2: WO2010/044164

SUMMARY OF INVENTION

Technical Problem

In general, a size of a power converter increases in accordance with a power capacity thereof. In a conventional uninterruptible power supply, a converter that supplies rated DC power to an inverter while an AC power supply is normal and a chopper circuit that supplies rated DC power to the inverter during power failure of the AC power supply are provided separately from each other and the power supply disadvantageously increases in size.

Therefore, a primary object of the present disclosure is to provide an uninterruptible power supply small in size.

Solution to Problem

An uninterruptible power supply in the present disclosure includes a power supply terminal, a first switch, a DC link portion, a converter, an inverter, and a chopper circuit. The power supply terminal receives AC power supplied from an AC power supply while the AC power supply is normal. The first switch is connected between a power storage device and the power supply terminal, and it is turned off while the AC power supply is normal and turned on during power failure of the AC power supply. The DC link portion is provided for supply and reception of DC power. The converter converts AC power supplied from the AC power supply to the power supply terminal into DC power to supply resultant DC power to the DC link portion while the AC power supply is normal, and that supplies to the DC link portion, DC power supplied from the power storage device through the first switch to the power supply terminal during power failure of the AC power supply. The inverter converts DC power from the DC link portion into AC power to supply resultant AC power to a load. The chopper circuit allows DC power from the DC link portion to be stored in the power storage device while the AC power supply is normal.

Advantageous Effects of Invention

In this uninterruptible power supply, the converter performs a function to supply rated DC power to the inverter during power failure of the AC power supply, so that the chopper circuit does not have to perform this function. Therefore, the chopper circuit can be reduced in size and hence the uninterruptible power supply can be reduced in size.

DESCRIPTION OF EMBODIMENTS

First Embodiment

Figure 1:
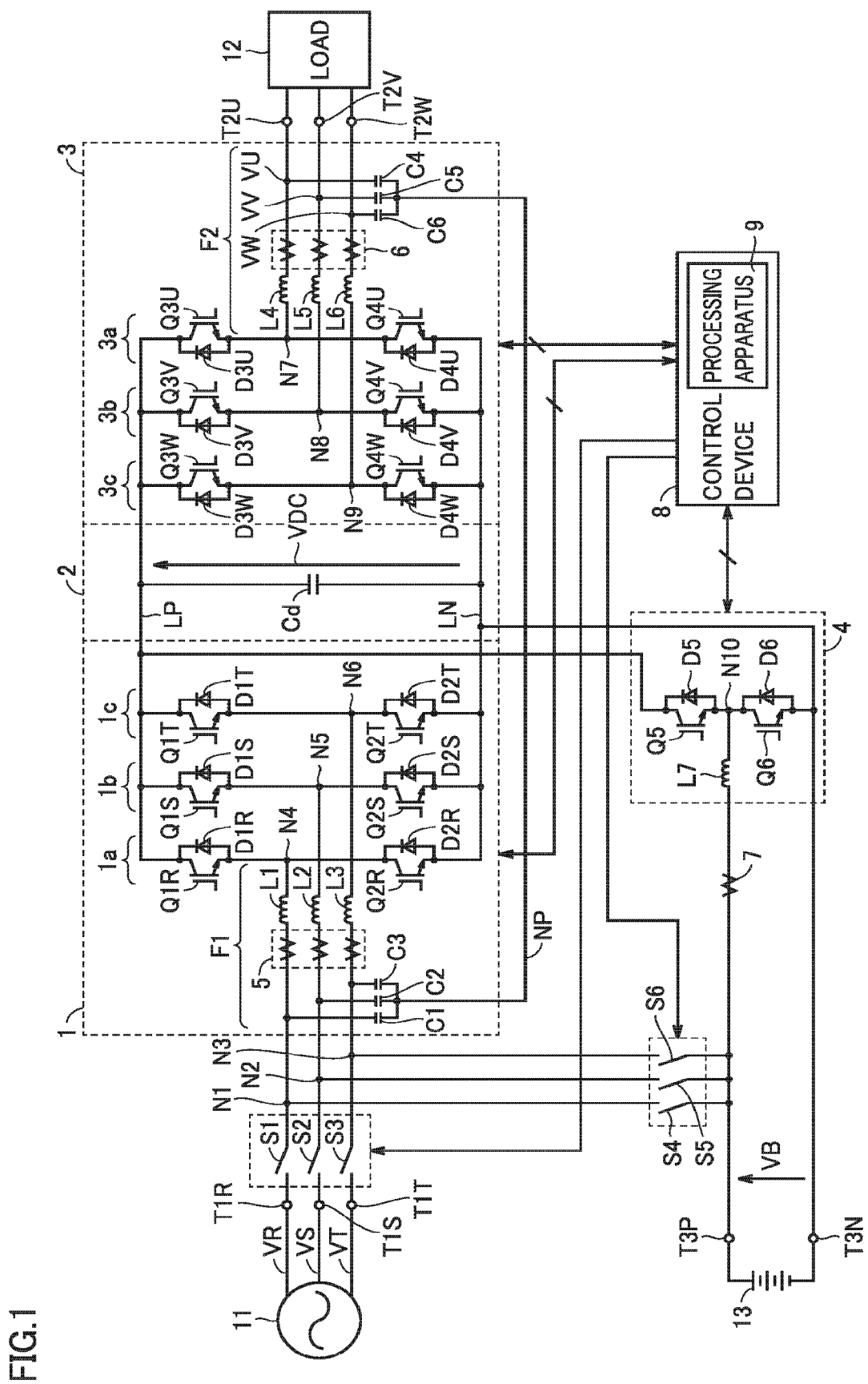
FIG. 1 is a circuit block diagram showing a configuration of an uninterruptible power supply according to a first embodiment.

FIG. 1 is a circuit block diagram showing a configuration of an uninterruptible power supply according to a first embodiment. In FIG. 1, this uninterruptible power supply includes AC input terminals T1R, T1S, and T1T, AC output terminals T2U, T2V and T2W, battery terminals T3P and T3N, switches S1 to S6, a converter 1, a DC link portion 2, an inverter 3, a chopper circuit 4, current detectors 5 to 7, and a control device 8.

AC input terminals T1R, T1S, and T1T receive three-phase AC voltages VR, VS, and VT at a commercial frequency from a commercial AC power supply 11, respectively. Instantaneous values of three-phase AC voltages VR, VS, and VT are detected by control device 8. Control device 8 detects whether or not power failure of commercial AC power supply 11 has occurred based on three-phase AC voltages VR, VS, and VT. Control device 8 controls converter 1 and inverter 3 in synchronization with three-phase AC voltages VR, VS, and VT.

AC output terminals T2U, T2V, and T2W are connected to a load 12. Load 12 is driven by three-phase AC voltages VU, VV, and VW at the commercial frequency supplied from the uninterruptible power supply through AC output terminals T2U, T2V, and T2W. Instantaneous values of three-phase AC voltages VU, VV, and VW are detected by control device 8.

Battery terminals T3P and T3N are connected to a positive electrode and a negative electrode of a battery 13, respectively. DC power is stored in battery 13 (power storage device). A capacitor instead of battery 13 may be connected. A DC voltage VB across battery terminals T3P and T3N is detected by control device 8.

Switches S1 to S3 have one terminals connected to AC input terminals T1R, T1S, and T1T, respectively, and have the other terminals connected to nodes N1 to N3 (power supply terminals), respectively. Switches S1 to S3 are controlled by control device 8.

While three-phase AC voltages VR, VS, and VT are normally supplied from commercial AC power supply 11 (while commercial AC power supply 11 is normal), switches S1 to S3 are turned on. When three-phase AC voltages VR, VS, and VT are not normally supplied from commercial AC power supply 11 (during power failure of commercial AC power supply 11), switches S1 to S3 are turned off.

Switches S4 to S6 have one terminals together connected to battery terminal T3P and have the other terminals connected to nodes N1 to N3, respectively. Switches S4 to S6 are controlled by control device 8. While commercial AC power supply 11 is normal, switches S4 to S6 are turned off. During power failure of commercial AC power supply 11, switches S4 to S6 are turned on. Switches S4 to S6 correspond to one embodiment of the "first switch" connected between the power storage device and the power supply terminal. Switches S1 to S3 correspond to one embodiment of the "second switch" connected between the AC power supply and the power supply terminal.

Therefore, while commercial AC power supply 11 is normal, nodes N1 to N3 receive three-phase AC voltages VR, VS, and VT from commercial AC power supply 11 through switches S1 to S3, respectively, and during power failure of commercial AC power supply 11, nodes N1 to N3 all receive battery voltage VB from battery 13 through switches S4 to S6.

DC link portion 2 is provided to supply and receive DC power among converter 1, inverter 3, and chopper circuit 4. DC link portion 2 includes DC lines LP and LN and a capacitor Cd. Capacitor Cd is connected between DC lines LP and LN, and smoothens a DC voltage VDC between DC lines LP and LN. DC line LN is connected to battery terminal T3N. DC voltage VDC is detected by control device 8.

Converter 1 is controlled by control device 8. Converter 1 converts AC power supplied from commercial AC power supply 11 through switches S1 to S3 into DC power to supply resultant DC power to DC link portion 2 while commercial AC power supply 11 is normal. Converter 1 supplies DC power supplied from battery 13 through switches S4 to S6 to DC link portion 2 during power failure of commercial AC power supply 11.

Specifically, converter 1 includes an AC filter F1 and leg circuits 1a to 1c. AC filter F1 includes capacitors C1 to C3 and reactors L1 to L3. Capacitors C1 to C3 have one electrodes connected to nodes N1 to N3, respectively, and have the other electrodes together connected to a neutral point NP. Reactors L1 to L3 have one electrodes connected to nodes N1 to N3, respectively, and have the other electrodes connected to nodes N4 to N6 (intermediate terminals), respectively.

AC filter F1 is a low-pass filter, and allows an AC current at the commercial frequency to flow from commercial AC power supply 11 to leg circuits 1a to 1c but prevents a current at a switching frequency from flowing from leg circuits 1a to 1c to commercial AC power supply 11. Current detector 5 detects currents I1 to I3 that flow through reactors L1 to L3 and provides signals showing detection values thereof to control device 8.

Leg circuits 1a, 1b, and 1c are provided in correspondence with an R phase, an S phase, and a T phase, respectively. Leg circuit 1a includes insulated gate bipolar transistor (IGBT) elements Q1R and Q2R and diodes D1R and D2R. Leg circuit 1b includes IGBT elements Q1S and Q2S and diodes D1S and D2S. Leg circuit 1c includes IGBT elements Q1T and Q2T and diodes D1T and D2T.

IGBT elements Q1R, Q1S, and Q1T have collectors together connected to DC line LP and have emitters connected to nodes N4 to N6, respectively. IGBT elements Q2R, Q2S, and Q2T have collectors connected to nodes N4 to N6, respectively, and have emitters together connected to DC line LN. Diodes D1R, D1S, D1T, D2R, D2S, and D2T are connected in anti-parallel to IGBT elements Q1R, Q1S, Q1T, Q2R, Q2S, and Q2T, respectively.

IGBT elements Q1R, Q1S, and Q1T may representatively collectively be referred to as an IGBT element Q1. IGBT elements Q2R, Q2S, and Q2T may representatively collectively be referred to as an IGBT element Q2. IGBT elements Q1 and Q2 implement first and second switching elements, respectively.

Any self-arc-distinguishing semiconductor switching element such as a metal oxide semiconductor field effect transistor (MOSFET) can be employed as the switching element, instead of the IGBT element.

Diodes DIR, DIS, and D1T may representatively collectively be referred to as a diode D1. Diodes D2R, D2S, and D2T may representatively collectively be referred to as a diode D2. Diodes D1 and D2 implement first and second diodes, respectively. Each of diodes D1 and D2 operates as a freewheeling diode.

While commercial AC power supply 11 is normal, three-phase AC voltages VR, VS, and VT are supplied from commercial AC power supply 11 through switches S1 to S3 to converter 1. Three-phase AC voltages VR, VS, and VT are subjected to three-phase full-wave rectification by diodes D1R, D1S, D1T, D2R, D2S, and D2T, and furthermore, they are smoothened by capacitor Cd to be converted to DC voltage VDC.

Control device 8 controls leg circuits 1a to 1c such that DC voltage VDC attains to a reference voltage VDCr, based on three-phase AC voltages VR, VS, and VT, three-phase AC currents I1 to I3, and DC voltage VDC.

In other words, control device 8 alternately turns on IGBT elements Q1 and Q2 at the switching frequency to adjust an on time period of IGBT element Q1 (that is, an off time period of IGBT element Q2) within one cycle.

For example, in leg circuit 1a, when IGBT element Q1R is turned on, DC line LP is connected to node N4 with IGBT element Q1R being interposed and a positive voltage is supplied to node N4. When IGBT element Q2R is turned on, node N4 is connected to DC line LN with IGBT element Q2R being interposed and a negative voltage is supplied to node N4. DC voltage VDC is thus converted to an AC voltage VRct at two levels. In leg circuits 1b and 1c as well, as in leg circuit 1a, DC voltage VDC is converted to AC voltages VSct and VTct each at two levels.

Control device 8 controls phases of three-phase AC voltages VRct, VSct, and VTct such that DC voltage VDC attains to reference voltage VDCr. As the phases of three-phase AC voltages VRct, VSct, and VTct are advanced as compared with phases of three-phase AC voltages VR, VS, and VT from commercial AC power supply 11, electric power is supplied from capacitor Cd through converter 1 to commercial AC power supply 11 and DC voltage VDC lowers.

In contrast, when the phases of three-phase AC voltages VRct, VSct, and VTct are retarded as compared with the phases of three-phase AC voltages VR, VS, and VT from commercial AC power supply 11, electric power is supplied from commercial AC power supply 11 through converter 1 to capacitor Cd and DC voltage VDC increases. Therefore, DC voltage VDC is maintained at reference voltage VDCr.

During power failure of commercial AC power supply 11, battery voltage VB is supplied from battery 13 through switches S4 to S6 to nodes N1 to N3. Control device 8 controls leg circuits 1a to 1c based on currents I1 to I3 and DC voltage VDC such that DC voltage VDC attains to reference voltage VDCr.

Specifically, control device 8 turns on and off IGBT element Q2 at a certain frequency. For example, in leg circuit 1a, when IGBT element Q2R is turned on, a current flows from the positive electrode of battery 13 through switch S4, reactor L1, IGBT element Q2R, and DC line LN to the negative electrode of battery 13, so that electromagnetic energy is stored in reactor L1.

When IGBT element Q2R is turned off, a current flows from the positive electrode of battery 13 through switch S4, reactor L1, diode DIR, DC line LP, capacitor Cd, and DC line LN to the negative electrode of battery 13, so that capacitor Cd is charged.

At this time, since electromagnetic energy in reactor L1 is emitted, DC voltage VDC becomes higher than battery voltage VB. In other words, battery voltage VB is boosted and converted to DC voltage VDC. In leg circuits 1b and 1c as well, as in leg circuit 1a, battery voltage VDC is boosted and converted to DC voltage VDC.

Control device 8 adjusts the on time period of IGBT element Q1 within one cycle of a signal that turns on and off IGBT element Q2 such that DC voltage VDC attains to reference voltage VDCr. For example, in leg circuit 1a, when the on time period of IGBT element Q2R is extended, electromagnetic energy stored in reactor L1 increases and DC voltage VDC increases.

In contrast, when the on time period of IGBT element Q2R is decreased, electromagnetic energy stored in reactor L1 decreases and DC voltage VDC lowers. In leg circuits 1b and 1c as well, as in leg circuit 1a, the level of DC voltage VDC is adjusted. Therefore, DC voltage VDC is maintained at reference voltage VDCr.

Furthermore, control device 8 performs an interleaving operation to set the signal that turns on and off IGBT element Q2R, the signal that turns on and off IGBT element Q2S, and the signal that turns on and off IGBT element Q2T to be 120-degree out of phase with one another.

Thus, diodes DIR, DIS, and D1T can be turned on at timings different from one another, and timing of supply of DC power from battery 13 through diodes DIR, DIS, and D1T to DC link portion 2 can be different. Therefore, a ripple voltage caused in DC voltage VDC during power failure of commercial AC power supply 11 can be lessened.

The sum of currents I1 to I3 that flow through reactors L1 to L3 at this time corresponds to an output current from battery 13. In the present first embodiment, a ripple in the output current from battery 13 can be lessened. Therefore, the ripple in the output current from battery 13 can be lessened by reactors L1 to L3 small in size, and increase in size of the apparatus can be suppressed.

Inverter 3 is controlled by control device 8. Inverter 3 converts DC power supplied from converter 1 through DC link portion 2 into AC power at the commercial frequency to supply resultant AC power to load 12.

Specifically, inverter 3 includes leg circuits 3a, 3b, and 3c and an AC filter F2. Leg circuits 3a, 3b, and 3c are provided in correspondence with a U phase, a V phase, and a W phase, respectively. Leg circuit 3a includes IGBT elements Q3U and Q4U and diodes D3U and D4U. Leg circuit 3b includes IGBT elements Q3V and Q4V and diodes D3V and D4V. Leg circuit 3c includes IGBT elements Q3W and Q4W and diodes D3W and D4W.

IGBT elements Q3U, Q3V, and Q3W have collectors together connected to DC line LP and have emitters connected to nodes N7 to N9, respectively. IGBT elements Q4U, Q4V, and Q4W have collectors connected to nodes N7 to N9, respectively, and have emitters together connected to DC line LN. Diodes D3U, D3V, D3W, D4U, D4V, and D4W are connected in anti-parallel to IGBT elements Q3U, Q3V, Q3W, Q4U, Q4V, and Q4W, respectively.

IGBT elements Q3U, Q3V, and Q3W may representatively collectively be referred to as an IGBT element Q3. IGBT elements Q4U, Q4V, and Q4W may representatively collectively be referred to as an IGBT element Q4.

Diodes D3U, D3V, and D3W may representatively collectively be referred to as a diode D3. Diodes D4U, D4V, and D4W may representatively collectively be referred to as a diode D4. Each of diodes D3 and D4 operates as a freewheeling diode.

Control device 8 alternately turns on IGBT elements Q3 and Q4 at the switching frequency to adjust the on time period of IGBT element Q3 (that is, the off time period of IGBT element Q4) within one cycle.

For example, in leg circuit 3a, when IGBT element Q3U is turned on, DC line LP is connected to node N7 with IGBT element Q3U being interposed, and a positive voltage is supplied to node N7. When IGBT element Q4U is turned on, node N7 is connected to DC line LN with IGBT element Q4U being interposed, and a negative voltage is supplied to node N7.

DC voltage VDC is thus converted to an AC voltage VUp at two levels. In leg circuits 3b and 3c as well, as in leg circuit 3a, DC voltage VDC is converted to AC voltages VVp and VWp each at two levels. Three-phase AC voltages VUp, VVp, and VWp are in synchronization with three-phase AC voltages VR, VS, and VT from commercial AC power supply 11, respectively.

AC filter F2 includes reactors L4 to L6 and capacitors C4 to C6. Reactors L4 to L6 have one electrodes connected to nodes N7 to N9, respectively, and have the other electrodes connected to AC output terminals T2U, T2V, and T2W, respectively. Capacitors C4 to C6 have one electrodes connected to AC output terminals T2U, T2V, and T2W, respectively, and have the other electrodes together connected to neutral point NP.

AC filter F2 is a low-pass filter and allows an AC current at the commercial frequency to flow from leg circuits 3a to 3c to load 12 but prevents a current at the switching frequency from flowing from leg circuits 3a to 3c to load 12. In other words, AC filter F2 converts three-phase AC voltages VUp, VVp, and VWp generated by leg circuits 3a to 3c into three-phase AC voltages VU, VV, and VW that vary like sinusoidal waves at the commercial frequency.

Current detector 6 detects currents I4 to I6 that flow through respective reactors L4 to L6 and provides signals showing detection values thereof to control device 8. Control device 8 controls leg circuits 3a to 3c based on three-phase AC voltages VU, VV, and VW and three-phase AC currents I4 to I6 such that three-phase AC voltages VU, VV, and VW attain to respective reference AC voltages VUr, VVr, and VWr.

Chopper circuit 4 is controlled by control device 8, and allows DC power generated by converter 1 to be stored in battery 13 while commercial AC power supply 11 is normal. Current detector 7 detects a current IB that flows between chopper circuit 4 and battery 13 and provides a signal indicating a detection value thereof to control device 8. Control device 8 controls chopper circuit 4 based on battery voltage VB and current IB such that battery voltage VB attains to a reference voltage VBr.

Specifically, chopper circuit 4 is a half-bridge chopper, and includes IGBT elements Q5 and Q6, diodes D5 and D6, and a reactor L7. IGBT element Q5 has a collector connected to DC line LP and has an emitter connected to a node N10. IGBT element Q6 has a collector connected to node N10 and has an emitter connected to DC line LN and battery terminal T3N. Reactor L7 is connected between node N10 and battery terminal T3P.

Control device 8 turns on and off IGBT element Q5 at a certain frequency while commercial AC power supply 11 is normal. When IGBT element Q5 is turned on, a current flows from DC line LP through IGBT element Q5, reactor L7, and battery 13 to DC line LN, so that battery 13 is charged and electromagnetic energy is stored in reactor L7. When IGBT element Q5 is turned off, a current flows from node N10 through reactor L7, battery 13, and diode D6 to node N10, so that battery 13 is charged and electromagnetic energy in reactor L7 is emitted.

Control device 8 adjusts the on time period of IGBT element Q5 within one cycle of a signal that turns on and off IGBT element Q5 such that battery voltage VB attains to reference voltage VBr. Control device 8 sets the on time period of IGBT element Q5 to be longer as a difference $\Delta VB = VBr - VB$ between reference voltage VBr and battery voltage VB is larger, and sets the on time period of IGBT element Q5 to be shorter as $\Delta VB$ is smaller. When a condition of $\Delta VB = 0$ is satisfied, control device 8 maintains IGBT element Q5 in an off state.

Such a function of control device 8 can be performed with the use of a processing apparatus 9. Processing apparatus 9 herein refers to dedicated hardware such as a dedicated processing circuit or a processor and a storage. In an example where dedicated hardware is employed, a single circuit, a composite circuit, a programmed processor, a parallel-programmed processor, an application specific integrated circuit (ASIC), a field programmable gate array (FPGA), or a combination thereof falls under the dedicated processing circuit.

When the processor and the storage are employed, each function is performed by software, firmware, or combination thereof. Software or firmware is described as a program and stored in the storage. The processor reads a program stored in the storage and executes the program. The program can also be defined as causing a computer to perform a procedure and a method of performing each function.

Such a semiconductor memory as a random access memory (RAM), a read only memory (ROM), a flash memory, an erasable programmable read only memory (EPROM), or an electrically erasable programmable read only memory (trademark) (EEPROM) falls under the storage. The semiconductor memory may be a non-volatile memory or a volatile memory. Other than the semiconductor memory, a magnetic disc, a flexible disc, an optical disc, a compact disc, a mini disc, or a digital versatile disc (DVD) falls under the storage.

Figure 2:
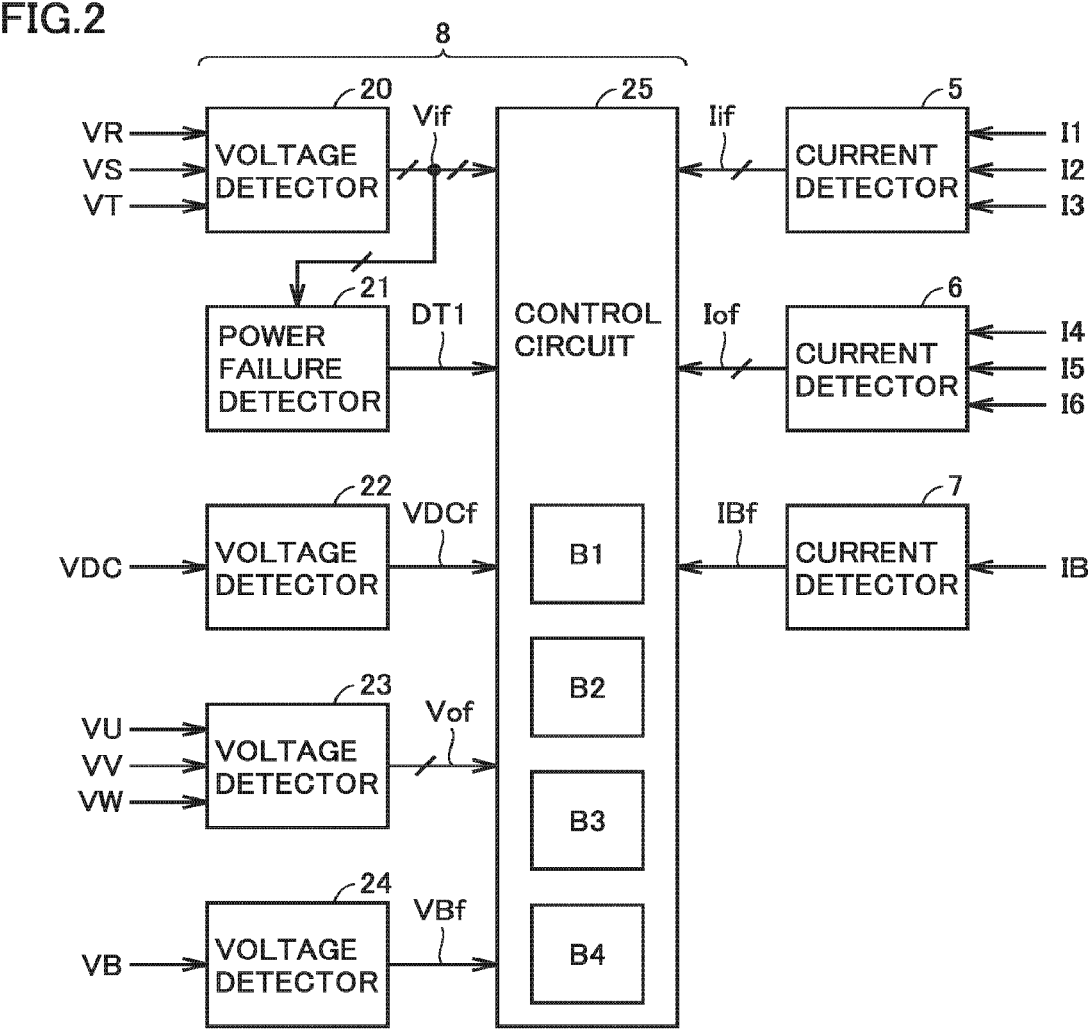
FIG. 2 is a block diagram showing a configuration of a control device shown in FIG. 1.

FIG. 2 is a block diagram showing a configuration of control device 8. In FIG. 2, control device 8 includes voltage detectors 20 and 22 to 24, a power failure detector 21, and a control circuit 25. Voltage detector 20 detects instantaneous values of three-phase AC voltages VR, VS, and VT supplied from commercial AC power supply 11 and provides a signal Vif indicating detection values thereof to power failure detector 21 and control circuit 25.

Power failure detector 21 determines whether or not power failure of commercial AC power supply 11 has occurred based on output signal Vif from voltage detector 20 and provides a signal DT1 indicating a result of determination to control circuit 25. For example, when levels of three-phase AC voltages VR, VS, and VT indicated by output signal Vif from voltage detector 20 are lower than a lower limit value, a power failure detection signal DT1 is set to the "L" level which is an activation level, and when the levels of three-phase AC voltages VR, VS, and VT are higher than the lower limit value, power failure detection signal DT1 is set to the "H" level which is an inactivation level.

Voltage detector 22 detects DC voltage VDC between DC lines LP and LN and provides a signal VDCf indicating a detection value thereof to control circuit 25. Voltage detector 23 detects instantaneous values of three-phase AC voltages VU, VV, and VW generated by inverter 3 and provides a signal Vof indicating detection values thereof to control circuit 25. Voltage detector 24 detects voltage VB across terminals of battery 13 and provides a signal VBf indicating a detection value thereof to control circuit 25.

Control circuit 25 controls switches S1 to S3, switches S4 to S6, converter 1, inverter 3, and chopper circuit 4 based on output signals Vif, VDCf, Vof, and VBf from respective voltage detectors 20, 22, 23, and 24, output signals Iif, Iof, and IBf from respective current detectors 5, 6, and 7 (FIG. 1), and output signal DT1 from power failure detector 21.

Control circuit 25 includes control blocks B1 to B4. Control block B1 controls switches S1 to S6. Control block B2 controls converter 1. Control block B3 controls inverter 3. Control block B4 controls chopper circuit 4.

Figure 3:
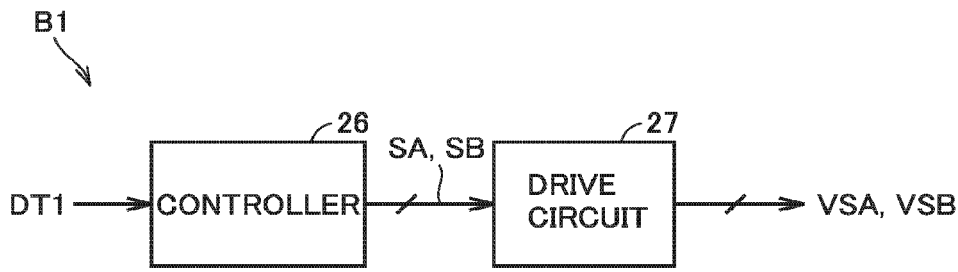
FIG. 3 is a block diagram showing a configuration of a control block B1 shown in FIG. 2.

FIG. 3 is a block diagram showing a configuration of control block B1. In FIG. 3, control block B1 includes a controller 26 and a drive circuit 27. Controller 26 generates a signal SA for controlling switches S1 to S3 and a signal SB for controlling switches S4 to S6, in accordance with power failure detection signal DT1.

When power failure detection signal DT1 is at the "H" level which is the inactivation level, signals SA and SB are set to the "H" level and the "L" level, respectively. When power failure detection signal DT1 is at the "L" level which is the activation level, signals SA and SB are set to the "L" level and the "H" level, respectively.

Drive circuit 27 generates control voltages VSA and VSB in accordance with signals SA and SB. When signals SA and SB are at the "H" level and the "L" level, respectively, control voltages VSA and VSB are set to the "H" level and the "L" level, respectively. When signals SA and SB are at the "L" level and the "H" level, respectively, control voltages VSA and VSB are set to the "L" level and the "H" level, respectively.

When control voltage VSA is set to the "H" level, switches S1 to S3 are turned on, and when control voltage VSA is set to the "L" level, switches S1 to S3 are turned off. When control voltage VSB is set to the "H" level, switches S4 to S6 are turned on, and when control voltage VSB is set to the "L" level, switches S4 to S6 are turned off.

Therefore, while commercial AC power supply 11 is normal, switches S1 to S3 are turned on and switches S4 to S6 are turned off. During power failure of commercial AC power supply 11, switches S1 to S3 are turned off and switches S4 to S6 are turned on.

Figure 4:
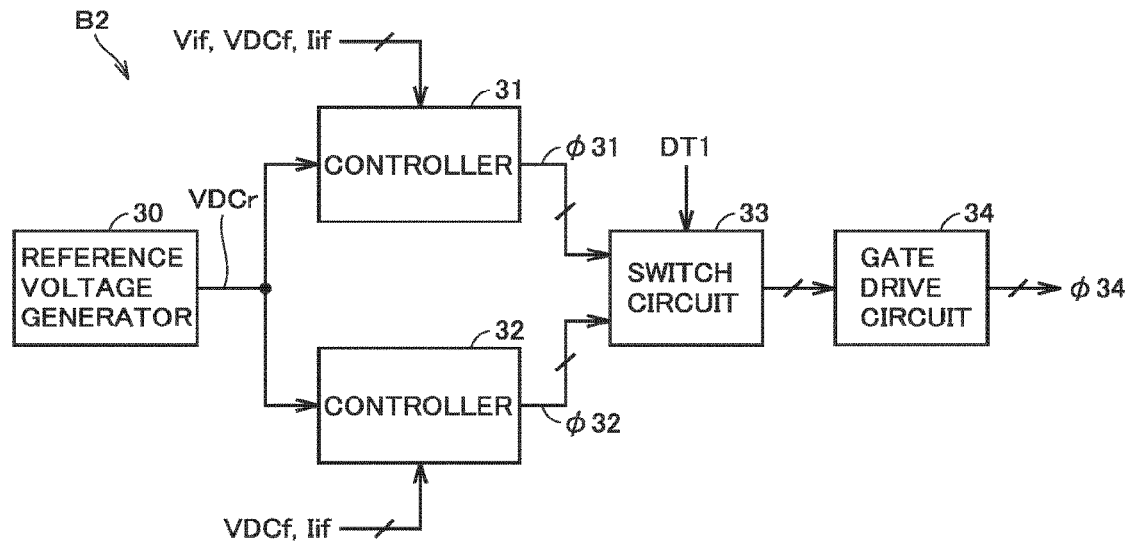
FIG. 4 is a block diagram showing a configuration of a control block B2 shown in FIG. 2.

FIG. 4 is a block diagram showing a configuration of control block B2 (FIG. 2). In FIG. 4, control block B2 includes a reference voltage generator 30, controllers 31 and 32, a switch circuit 33, and a gate drive circuit 34.

Reference voltage generator 30 generates reference voltage VDCr. Controller 31 generates a pulse width modulation (PWM) signal $\phi 31$ for converting three-phase AC voltages VR, VS, and VT into DC voltage VDC based on reference voltage VDCr, output signals Vif and VDCf from respective voltage detectors 20 and 22, and output signal Iif from current detector 5.

Controller 32 generates a PWM signal $\phi 32$ for boosting battery voltage VB to generate DC voltage VDC based on reference voltage VDCr, output signal VDCf from voltage detector 22, and output signal Iif from current detector 5.

When power failure detection signal DT1 is at the "H" level which is the inactivation level, switch circuit 33 provides PWM signal $\phi 31$ from controller 31 to gate drive circuit 34, and when power failure detection signal DT1 is at the "L" level which is the activation level, switch circuit 33 provides PWM signal $\phi 32$ from controller 32 to gate drive circuit 34.

Gate drive circuit 34 generates a gate signal $\phi 34$ for turning on and off each of IGBTs Q1R, Q1S, Q1T, Q2R, Q2S, and Q2T in accordance with PWM signal $\phi 31$ or $\phi 32$ from switch circuit 33.

Figure 5:
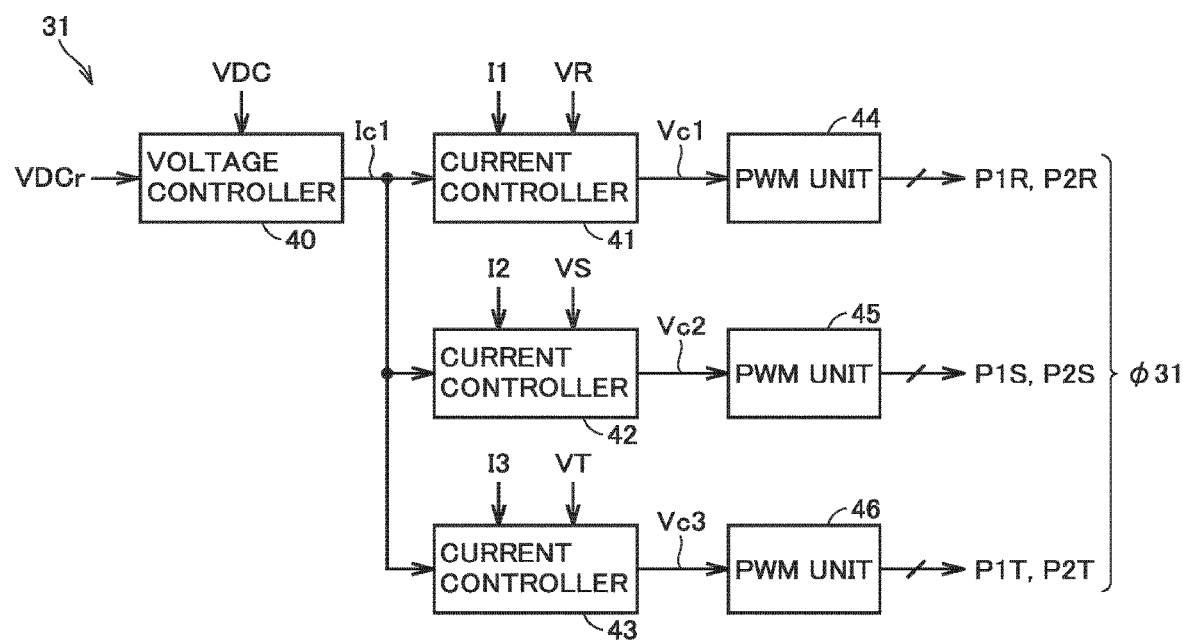
FIG. 5 is a block diagram showing a configuration of a controller 31 shown in FIG. 4.

FIG. 5 is a block diagram showing a configuration of controller 31 (FIG. 4). In FIG. 5, controller 31 includes a voltage controller 40, current controllers 41 to 43, and PWM units 44 to 46. Voltage controller 40 generates a current command value Ic1 in accordance with a difference $\Delta VDC=VDCr-VDC$ between reference voltage VDCr and DC voltage VDC indicated by output signal VDCf from voltage detector 22.

Current controller 41 generates a voltage command value Vc1 that varies like a sinusoidal wave at the commercial frequency based on current command value Ic1, AC input current I1 indicated by output signal Iif from current detector 5, and AC voltage VR indicated by output signal Vif from voltage detector 20.

Current controller 42 generates a voltage command value Vc2 that varies like a sinusoidal wave at the commercial frequency based on current command value Ic1, AC input current I2 indicated by output signal $\phi$Iif from current detector 5, and AC voltage VS indicated by output signal Vif from voltage detector 20.

Current controller 43 generates a voltage command value Vc3 that varies like a sinusoidal wave at the commercial frequency based on current command value Ic1, AC input current I3 indicated by output signal Iif from current detector 5, and AC voltage VT indicated by output signal Vif from voltage detector 20. Voltage command values Vc1, Vc2, and Vc3 are 120-degree out of phase with one another.

PWM unit 44 compares magnitude of voltage command value Vc1 with magnitude of a bipolar carrier signal that varies like a triangular wave at a switching frequency, and generates PWM signals P1R and P2R for controlling IGBT elements Q1R and Q2R, respectively, based on a result of comparison. PWM signal P2R is an inverted version of PWM signal P1R.

PWM unit 45 compares magnitude of voltage command value Vc2 with magnitude of a bipolar carrier signal that varies like a triangular wave at a switching frequency, and generates PWM signals P1S and P2S for controlling IGBT elements Q1S and Q2S, respectively, based on a result of comparison. PWM signal P2S is an inverted version of PWM signal P1S.

PWM unit 46 compares magnitude of voltage command value Vc3 with magnitude of a bipolar carrier signal that varies like a triangular wave at a switching frequency, and generates PWM signals P1T and P2T for controlling IGBT elements Q1T and Q2T, respectively, based on a result of comparison. PWM signal P2T is an inverted version of PWM signal P1T. PWM signals P1R, P2R, P1S, P2S, P1T, and P2T are included in PWM signal $\phi 31$ (FIG. 4).

When switch circuit 33 selects PWM signal $\phi 31$, gate drive circuit 34 (FIG. 4) generates gate signals G1R, G2R, G1S, G2S, G1T, and G2T for controlling IGBT elements Q1R, Q2R, Q1S, Q2S, Q1T, and Q2T in accordance with PWM signals P1R, P2R, P1S, P2S, P1T, and P2T. Gate signals G1R, G2R, G1S, G2S, G1T, and G2T are included in gate signal $\phi 34$ (FIG. 4).

PWM signals P1R, P1S, and P1T may representatively collectively be referred to as a PWM signal P1. Gate signals G1R, G1S, and G1T may representatively collectively be referred to as a gate signal G1. When PWM signal P1 is set to the "H" level, gate signal G1 is set to the "H" level. When PWM signal P1 is set to the "L" level, gate signal G1 is set to the "L" level. Gate signal G1 is applied across the gate and the emitter of IGBT element Q1.

PWM signals P2R, P2S, and P2T may representatively collectively be referred to as a PWM signal P2. Gate signals G2R, G2S, and G2T may representatively collectively be referred to as a gate signal G2. When PWM signal P2 is set to the "H" level, gate signal G2 is set to the "H" level. When PWM signal P2 is set to the "L" level, gate signal G2 is set to the "L" level. Gate signal G2 is applied across the gate and the emitter of IGBT element Q2.

Figure 6:
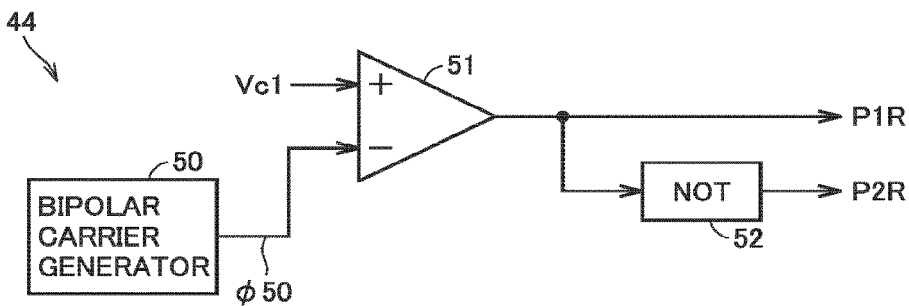
FIG. 6 is a block diagram showing a configuration of a PWM unit 44 shown in FIG. 5.

FIG. 6 is a block diagram showing a configuration of PWM unit 44 (FIG. 5). In FIG. 6, PWM unit 44 includes a bipolar carrier generator 50, a comparator 51, and an inversion circuit 52. Bipolar carrier generator 50 generates a bipolar carrier signal $\phi 50$. Bipolar carrier signal $\phi 50$ varies like a triangular wave at the switching frequency between a negative voltage (−Va) and a positive voltage (+Va). Voltage command value Vc1 varies like a sinusoidal wave at the commercial frequency at an amplitude smaller than that of bipolar carrier signal $\phi 50$.

Voltage command value Vc1 is provided to a non-inverting input terminal (+ terminal) of comparator 51. Bipolar carrier signal $\phi 50$ is provided to an inverting input terminal (− terminal) of comparator 51. Comparator 51 compares magnitude of voltage command value Vc1 with magnitude of bipolar carrier signal $\phi 50$, and outputs a signal indicating a result of comparison as PWM signal P1R. Inversion circuit 52 inverts PWM signal P1R to output PWM signal P2R.

When the level of voltage command value Vc1 is higher than the level of bipolar carrier signal $\phi 50$, PWM signals P1R and P2R are set to the "H" level and the "L" level, respectively. When the level of voltage command value Vc1 is lower than the level of bipolar carrier signal $\phi 50$, PWM signals P1R and P2R are set to the "L" level and the "H" level, respectively. Since each of PWM units 45 and 46 is the same in configuration as PWM unit 44, description thereof will not be repeated.

Actually, in order to prevent IGBT elements Q1 and Q2 from simultaneously being turned on to prevent DC lines LP and LN from being short-circuited, a circuit that provides a dead time to the PWM signal is provided in a stage subsequent to PWM units 44 to 46.

Figure 7:
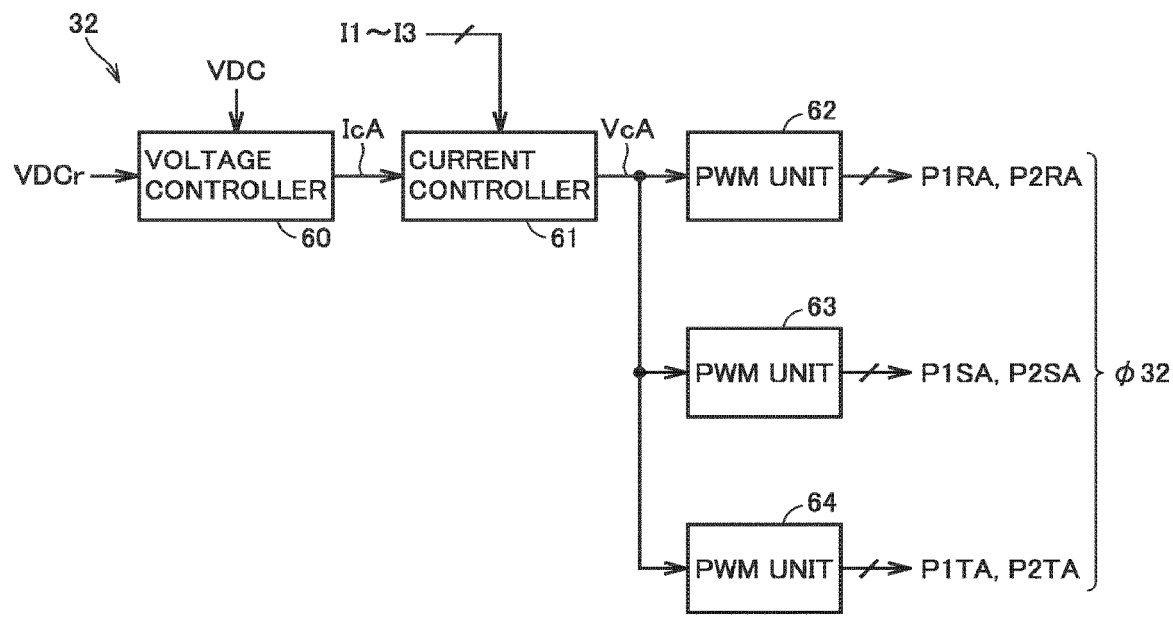
FIG. 7 is a block diagram showing a configuration of a controller 32 shown in FIG. 4.

FIG. 7 is a block diagram showing a configuration of controller 32 (FIG. 4). In FIG. 7, controller 32 includes a voltage controller 60, a current controller 61, and PWM units 62 to 64. Voltage controller 60 generates a current command value IcA in accordance with difference $\Delta VDC = VDCr − VDC$ between reference voltage VDCr and DC voltage VDC indicated by output signal VDCf from voltage detector 22. Current controller 61 generates a DC voltage command value VcA based on current command value IcA and currents I1 to I3 indicated by output signal Iif from current detector 5.

PWM unit 62 compares magnitude of voltage command value VcA with magnitude of a first positive carrier signal that varies like a triangular wave at a certain frequency, and generates PWM signals P1RA and P2RA for controlling respective IGBT elements Q1R and Q2R based on a result of comparison. PWM signal P2RA is an inverted version of PWM signal P1RA.

PWM unit 63 compares magnitude of voltage command value VcA with magnitude of a second positive carrier signal that varies like a triangular wave at a certain frequency, and generates PWM signals P1SA and P2SA for controlling respective IGBT elements Q1S and Q2S based on a result of comparison. PWM signal P2SA is an inverted version of PWM signal P1SA.

PWM unit 64 compares magnitude of voltage command value VcA with magnitude of a third positive carrier signal that varies like a triangular wave at a certain frequency, and generates PWM signals P1TA and P2TA for controlling respective IGBT elements Q1T and Q2T based on a result of comparison. PWM signal P2TA is an inverted version of PWM signal P1TA. PWM signals P1RA, P2RA, P1SA, P2SA, P1TA, and P2TA are included in PWM signal $\phi 32$ (FIG. 4).

When switch circuit 33 selects PWM signal $\phi 32$, gate drive circuit 34 (FIG. 4) generates gate signals G1R, G2R, G1S, G2S, G1T, and G2T for controlling IGBT elements Q1R, Q2R, Q1S, Q2S, Q1T, and Q2T in accordance with PWM signals P1RA, P2RA, P1SA, P2SA, P1TA, and P2TA. Gate signals G1R, G2R, G1S, G2S, G1T, and G2T are included in gate signal $\phi 34$ (FIG. 4).

PWM signals P1RA, P1SA, and P1TA may representatively collectively be referred to as a PWM signal P1A. When PWM signal P1A is set to the "H" level, gate signal G1 is set to the "H" level. When PWM signal P1A is set to the "L" level, gate signal G1 is set to the "L" level. Gate signal G1 is applied across the gate and the emitter of IGBT element Q1.

PWM signals P2RA, P2SA, and P2TA may representatively collectively be referred to as a PWM signal P2A. When PWM signal P2A is set to the "H" level, gate signal G2 is set to the "H" level. When PWM signal P2A is set to the "L" level, gate signal G2 is set to the "L" level. Gate signal G2 is applied across the gate and the emitter of IGBT element Q2.

Figure 8:
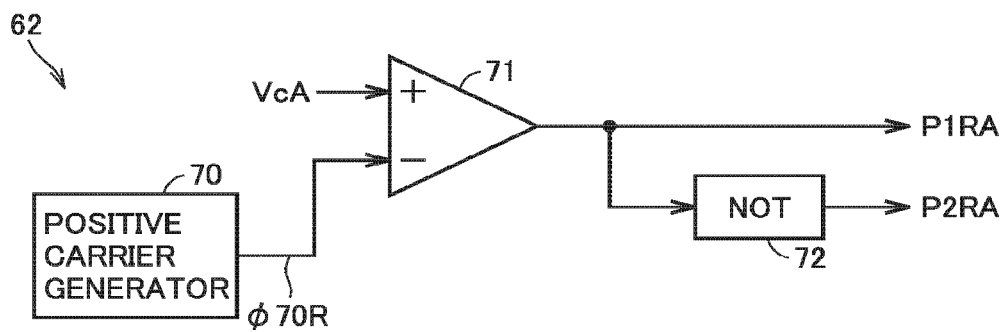
FIG. 8 is a block diagram showing a configuration of a PWM unit 62 shown in FIG. 5.

FIG. 8 is a circuit block diagram showing a configuration of PWM unit 62. In FIG. 8, PWM unit 62 includes a positive carrier generator 70, a comparator 71, and an inversion circuit 72. Positive carrier generator 70 generates a first positive carrier signal $\phi 70R$. First positive carrier signal $\phi 70R$ varies like a triangular wave at a certain frequency between a reference voltage (0 V) and a positive voltage (+Vb). Voltage command value VcA is a DC voltage between the reference voltage (0) and the positive voltage (+Vb).

Voltage command value VcA is provided to a non-inverting input terminal (+ terminal) of comparator 71. First positive carrier signal $\phi 70R$ is provided to an inverting input terminal (− terminal) of comparator 71. Comparator 71 compares magnitude of voltage command value VcA with magnitude of first positive carrier signal $\phi 70R$ and outputs a signal indicating a result of comparison as PWM signal P1RA. Inversion circuit 72 inverts PWM signal P1RA to output PWM signal P2RA.

When the level of voltage command value VcA is higher than the level of positive carrier signal $\phi 70$, PWM signals P1RA and P2RA are set to the "H" level and the "L" level, respectively. When the level of voltage command value VcA is lower than the level of positive carrier signal $\phi 70$, PWM signals P1RA and P2RA are set to the "L" level and the "H" level, respectively.

PWM units 63 and 64 are each the same in configuration as PWM unit 62. Positive carrier generators 70 of PWM units 63 and 64, however, generate a first positive carrier signal φ70S and a second positive carrier signal φ70T, respectively.

Actually, in order to prevent IGBT elements Q1 and Q2 from simultaneously being turned on to prevent DC lines LP and LN from being short-circuited, a circuit that provides a dead time to the PWM signal is provided in a stage subsequent to PWM units 62 to 64.

Figure 9:
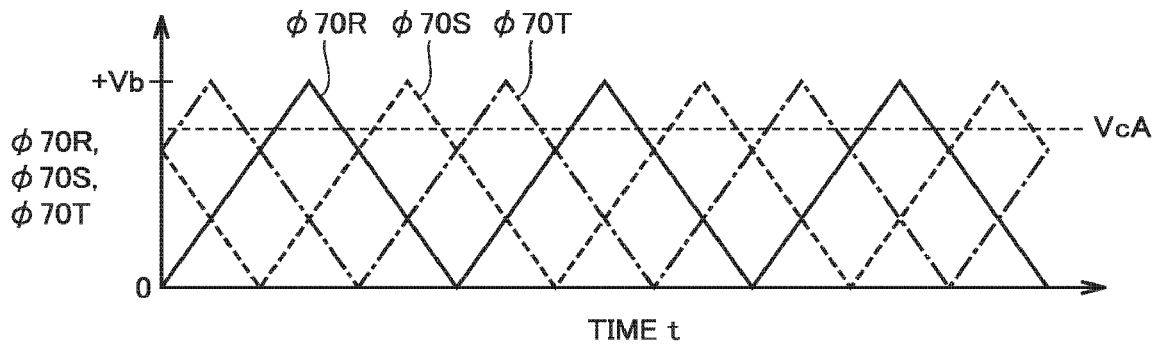
FIG. 9 is a time chart showing waveforms of three positive carrier signals used by three PWM units shown in FIG. 7.

FIG. 9 is a diagram showing waveforms of positive carrier signals φ70R, φ70S, and φ70T generated by PWM units 62 to 64 shown in FIG. 7. As shown in FIG. 9, positive carrier signals φ70R, φ70S, and φ70T are 120-degree out of phase with one another. Therefore, PWM signals P2RA, P2SA, and P2TA are also 120-degree out of phase with one another and gate signals G2R, G2S, and G2T are also 120-degree out of phase with one another.

Therefore, timings of turn-on and -off of IGBT elements Q2R, Q2S, and Q2T of converter 1 are different by ⅓ of one cycle from one another, and timings of a flow of a current from battery 13 through diodes D1R, D1S, and D1T to capacitor Cd are different by ⅓ of one cycle from one another. Therefore, an amplitude of a ripple voltage superimposed on DC voltage VDC can be made smaller.

Figure 10:
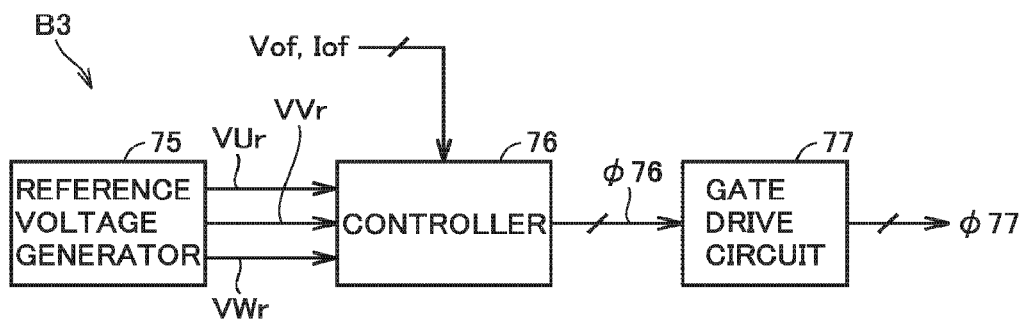
FIG. 10 is a block diagram showing a configuration of a control block B3 shown in FIG. 2.

FIG. 10 is a block diagram showing a configuration of control block B3 (FIG. 2). In FIG. 10, control block B3 includes a reference voltage generator 75, a controller 76, and a gate drive circuit 77.

Reference voltage generator 75 generates three-phase reference voltages VUr, VVr, and VWr. Each of reference voltages VUr, VVr, and VWr varies like a sinusoidal wave at the commercial frequency. Reference voltages VUr, VVr, and VWr are 120-degree out of phase with one another.

Controller 76 generates a PWM signal φ76 for converting DC voltage VDC into three-phase AC voltages VR, VS, and VT based on reference voltages VUr, VVr, and VWr, output signal Vof from voltage detector 23 (FIG. 2), and output signal Iof from current detector 6. PWM signal φ76 includes six PWM signals P3U, P3V, P3W, P4U, P4V, and P4W corresponding to IGBT elements Q3U, Q3V, Q3W, Q4U, Q4V, and Q4W, respectively.

Gate drive circuit 77 generates a gate signal φ77 for turning on and off each of IGBT elements Q3U, Q3V, Q3W, Q4U, Q4V, and Q4W in accordance with PWM signal φ76. Gate signal φ77 includes gate signals G3U, G3V, G3W, G4U, G4V, and G4W. Gate signals G3U, G3V, G3W, G4U, G4V, and G4W are provided across the gates and the emitters of IGBT elements Q3U, Q3V, Q3W, Q4U, Q4V, and Q4W, respectively. Each of IGBT elements Q3U, Q3V, Q3W, Q4U, Q4V, and Q4W is thus turned on and off and DC voltage VDC is converted to three-phase AC voltages VU, VV, and VW.

Figure 11:
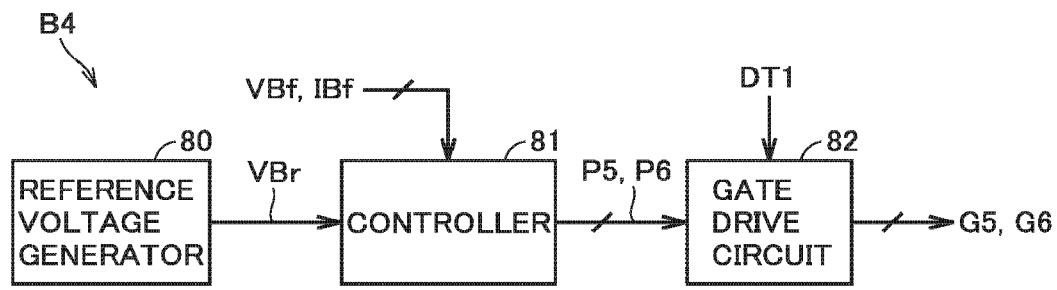
FIG. 11 is a block diagram showing a configuration of a control block B4 shown in FIG. 2.

FIG. 11 is a block diagram showing a configuration of control block B4 (FIG. 2). In FIG. 11, control block B4 includes a reference voltage generator 80, a controller 81, and a gate drive circuit 82.

Reference voltage generator 80 generates reference voltage VBr. Controller 81 generates PWM signals P5 and P6 for converting DC voltage VDC into battery voltage VB based on reference voltage VBr, output signal VBf from voltage detector 24, and output signal IBf from current detector 7. PWM signal P6 is an inverted version of PWM signal P5.

When power failure detection signal DT1 is at the "H" level which is the inactivation level, gate drive circuit 82 generates gate signals G5 and G6 for turning on and off IGBT elements Q5 and Q6 in accordance with PWM signals P5 and P6. When power failure detection signal DT1 is at the "L" level which is the activation level, gate drive circuit 82 maintains each of gate signals G5 and G6 at the "L" level.

Gate signals G5 and G6 are provided across the gates and the emitters of respective IGBT elements Q5 and Q6. Thus, while commercial AC power supply 11 is normal, IGBT element Q5 is turned on and off at a certain frequency so that DC voltage VDC is converted to battery voltage VB. When IGBT element Q5 is turned off, a current flows through a path of reactor L7, battery 13, and diode D6. Therefore, even when gate signal G6 is set to the "H" level, IGBT element Q6 is not turned on. During power failure of commercial AC power supply 11, both of IGBT elements Q5 and Q6 are turned off and an operation of chopper circuit 4 is stopped.

Operations of the uninterruptible power supply shown in FIGS. 1 to 11 will now be described. While commercial AC power supply 11 is normal, power failure detector 21 (FIG. 2) sets power failure detection signal DT1 to the "H" level which is the inactivation level, so that controller 26 and drive circuit 27 (FIG. 3) turn on switches S1 to S3 and turn off switches S4 to S6. Thus, three-phase AC voltages VR, VS, and VT are supplied from commercial AC power supply 11 through switches S1 to S3 to converter 1.

Switch circuit 33 (FIG. 4) selects controller 31. Reference voltage generator 30, controller 31, and gate drive circuit 34 have converter 1 (FIG. 1) operate. Three-phase AC voltages VR, VS, and VT supplied from commercial AC power supply 11 through switches S1 to S3 are converted by converter 1 into DC voltage VDC.

Reference voltage generator 75, controller 76, and gate drive circuit 77 (FIG. 10) have inverter 3 (FIG. 1) operate, so that DC voltage VDC is converted to three-phase AC voltages VU, VV, and VW and supplied to load 12.

Reference voltage generator 80, controller 81, and gate drive circuit 82 (FIG. 11) have the chopper circuit (FIG. 1) operate, so that DC voltage VDC is down-converted and supplied to battery 13 and battery 13 is charged therewith.

When commercial AC power supply 11 fails, power failure detector 21 (FIG. 2) sets power failure detection signal DT1 to the "L" level which is the activation level, so that controller 26 and drive circuit 27 (FIG. 3) turn off switches S1 to S3 and turn on switches S4 to S6. Thus, DC voltage VB of battery 13 is supplied through switches S4 to S6 to converter 1. Gate drive circuit 82 (FIG. 11) stops the operation of the chopper circuit (FIG. 1).

Switch circuit 33 (FIG. 4) selects controller 32. Reference voltage generator 30, controller 32, and gate drive circuit 34 have converter 1 (FIG. 1) operate. DC voltage VB supplied from battery 13 through switches S4 to S6 is boosted and converted to DC voltage VDC by converter 1.

Reference voltage generator 75, controller 76, and gate drive circuit 77 (FIG. 10) have inverter 3 (FIG. 1) operate, so that DC voltage VDC is converted to three-phase AC voltages VU, VV, and VW and supplied to load 12. Therefore, even when commercial AC power supply 11 fails, an operation of load 12 can continue during a period during which there is DC power stored in battery 13.

As set forth above, in this first embodiment, converter 1 supplies rated DC power to inverter 3 during power failure of commercial AC power supply 11. Therefore, chopper circuit 4 does not have to perform the function to supply rated DC power to inverter 3. Chopper circuit 4 can thus be reduced in size and hence the uninterruptible power supply can be reduced in size.

By shifting timings of turn-on and -off of IGBT elements Q2R, Q2S, and Q2T of converter 1 by ⅓ of one cycle during power failure of commercial AC power supply 11, timings of a flow of the current from battery 13 through diodes D1R, DIS, and D1T to capacitor Cd are different by ⅓ of one cycle from one another. Therefore, the amplitude of a ripple voltage superimposed on DC voltage VDC can be suppressed. A ripple in the output current from battery 13 can be reduced by reactors L1 to L3 small in size and increase in size of the apparatus can be suppressed.

Second Embodiment

Figure 12:
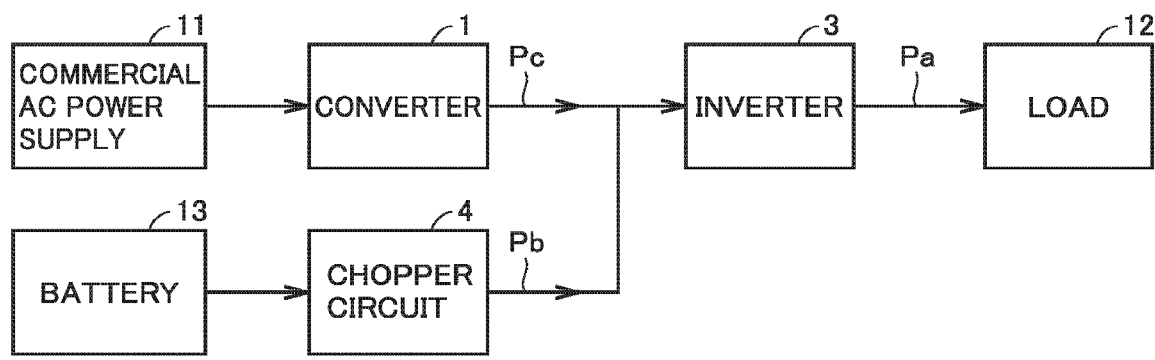
FIG. 12 is a block diagram showing an operation of an uninterruptible power supply at overload according to a second embodiment.

FIG. 12 is a block diagram showing an operation of an uninterruptible power supply at overload according to a second embodiment. In FIG. 12, in this uninterruptible power supply, when it is overloaded while commercial AC power supply 11 is normal, power Pa to be consumed in load 12 is supplied from both of converter 1 and chopper circuit 4. At this time, chopper circuit 4 supplies certain DC power Pb and converter 1 supplies remaining DC power Pc=Pa−Pb. Certain DC power Pb is set, for example, to a value equal to or lower than rated power of chopper circuit 4.

Specifically, when AC currents I4 to I6 (load currents) indicated by an output signal ϕ6 from current detector 6 exceeds an upper limit value (at overload), control device 8 (FIG. 1) controls chopper circuit 4 to supply DC power Pb to inverter 3 and controls converter 1 such that DC voltage VDC attains to reference voltage VDCr. DC power Pc=Pa−Pb is thus supplied from converter 1 to inverter 3. Though the method of controlling converter 1 is the same as in the first embodiment, a method of controlling chopper circuit 4 is different from the method in the first embodiment.

The method of controlling chopper circuit 4 will now be described in detail. At overload while commercial AC power supply 11 is normal, control device 8 turns on and off IGBT element Q6 (FIG. 1) of chopper circuit 4 at a certain frequency. When IGBT element Q6 is turned on, a current flows from the positive electrode of battery 13 through reactor L7 and IGBT element Q6 to the negative electrode of battery 13 so that electromagnetic energy is stored in reactor L7.

When IGBT element Q6 is turned off, a current flows from the positive electrode of battery 13 through reactor L7, diode D5, DC line LP, capacitor Cd, and DC line LN to the negative electrode of battery 13 so that capacitor Cd is charged. At this time, electromagnetic energy in reactor L7 is emitted and battery voltage VB is boosted and converted to DC voltage VDC.

Figure 13:
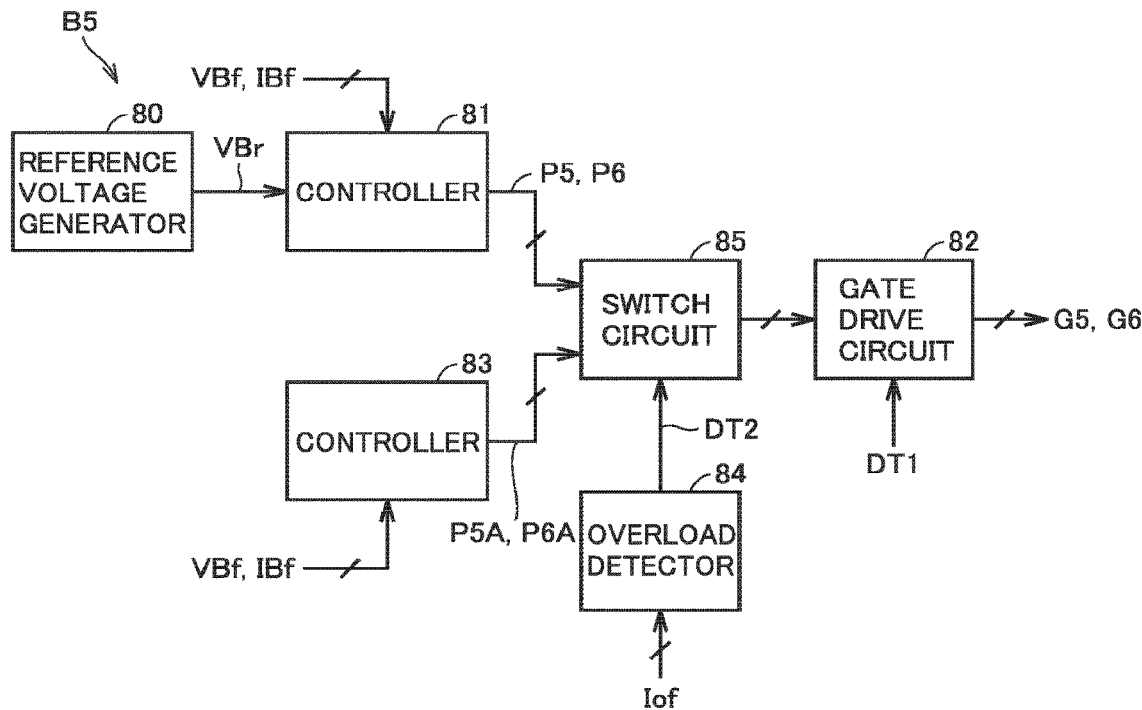
FIG. 13 is a block diagram showing a main part of the uninterruptible power supply described with reference to FIG. 12.

FIG. 13 is a block diagram showing a main part of this uninterruptible power supply, which is to be compared with FIG. 4. Referring to FIG. 13, this uninterruptible power supply is different from the uninterruptible power supply in the first embodiment in that control block B4 is replaced with a control block B5 in control circuit 25 (FIG. 2). Control block B5 is implemented by adding a controller 83, an overload detector 84, and a switch circuit 85 to control block B4.

Controller 83 generates PWM signals P5A and P6A for supplying certain DC power Pb to DC link portion 2 at overload, based on output signal VBf from voltage detector 24 and output signal IBf from current detector 7. PWM signal P6A is an inverted version of PWM signal P5A.

Overload detector 84 determines whether or not load currents I4 to I6 have exceeded an upper limit value IH based on output signal Iof from current detector 6 and outputs a signal DT2 indicating a result of determination. When load currents I4 to I6 do not exceed upper limit value IH (that is, not at overload), overload detection signal DT2 is set to the "L" level which is the inactivation level. When load currents I4 to I6 have exceeded upper limit value IH (that is, at overload), overload detection signal DT2 is set to the "H" level which is the activation level.

When overload detection signal DT2 is at the "L" level which is the inactivation level, switch circuit 85 provides PWM signals P5 and P6 from controller 81 to gate drive circuit 82, and when overload detection signal DT2 is at the "H" level which is the activation level, switch circuit 85 provides PWM signals P5A and P6A from controller 83 to gate drive circuit 82.

When overload detection signal DT2 is set to the "L" level which is the inactivation level, PWM signals P5 and P6 from controller 81 are provided through switch circuit 85 to gate drive circuit 82. In this case, chopper circuit 4 is controlled as in the first embodiment.

When overload detection signal DT2 is at the "H" level which is the activation level, PWM signals P5A and P6A from controller 83 are provided through switch circuit 85 to gate drive circuit 82. Gate drive circuit 82 generates gate signals G5 and G6 for turning on and off IGBT elements Q5 and Q6 in accordance with PWM signals P5A and P6A, respectively.

Gate signals G5 and G6 are provided across the gates and the emitters of IGBT elements Q5 and Q6, respectively. Thus, at overload, IGBT element Q6 is turned on and off at a certain frequency and battery voltage VB is converted to DC voltage VDC.

As IGBT element Q6 is turned off, a current flows from the positive electrode of battery 13 through reactor L7, diode D5, and capacitor Cd to the negative electrode of battery 13. Therefore, even when gate signal G5 is set to the "H" level, IGBT element Q5 is not turned on. During power failure of commercial AC power supply 11, both of IGBT elements Q5 and Q6 are turned off and an operation of chopper circuit 4 is stopped.

As set forth above, in this second embodiment, at overload, DC power is supplied from both of converter 1 and chopper circuit 4 to inverter 3. Therefore, a condition for thermal design of converter 1 on the assumption that overload will occur can be relaxed and converter 1 can be reduced in size.

Third Embodiment

In an example in which switches S1 to S3 (FIG. 1) are implemented by mechanical switches, it takes some time Toff from fall of power failure detection signal DT1 (FIG. 2) from the "H" level to the "L" level until transition of switches S1 to S3 from the on state to the off state. In a final stage of commercial AC power supply 11, a three-phase transformer is provided.

Therefore, when a boosting operation by converter 1 is immediately performed in response to an edge of falling from the "H" level to the "L" level of power failure detection signal D1, leg circuits 1a to 1c of converter 1 are short-circuited by the three-phase transformer with switches S1 to S3 being interposed and an overcurrent may flow.

In this third embodiment, the boosting operation by converter 1 is stopped until a certain time period Td elapses since fall of power failure detection signal DT1 from the "H" level to the "L" level. Time period Td is equal to or longer than time period Toff necessary for transition of switches S1 to S3 from the on state to the off state.

As the boosting operation by converter 1 is stopped until lapse of time period Td since occurrence of power failure of commercial AC power supply 11, DC power in capacitor Cd is consumed by inverter 3 and DC voltage VDC lowers. When DC voltage VDC becomes lower than a lower limit value VDCL, a modulation factor of inverter 3 becomes excessively high and waveforms of three-phase AC voltages VU, VV, and VW supplied to load 12 are distorted. Therefore, when DC voltage VDC becomes lower than lower limit value VDCL, an operation of inverter 3 is stopped and an operation of load 12 is stopped.

In the present third embodiment, during a period from occurrence of power failure of commercial AC power supply 11 until lapse of time period Td, chopper circuit 4 is caused to supply DC power to inverter 3 to suppress lowering in DC voltage VDC.

Figure 14:
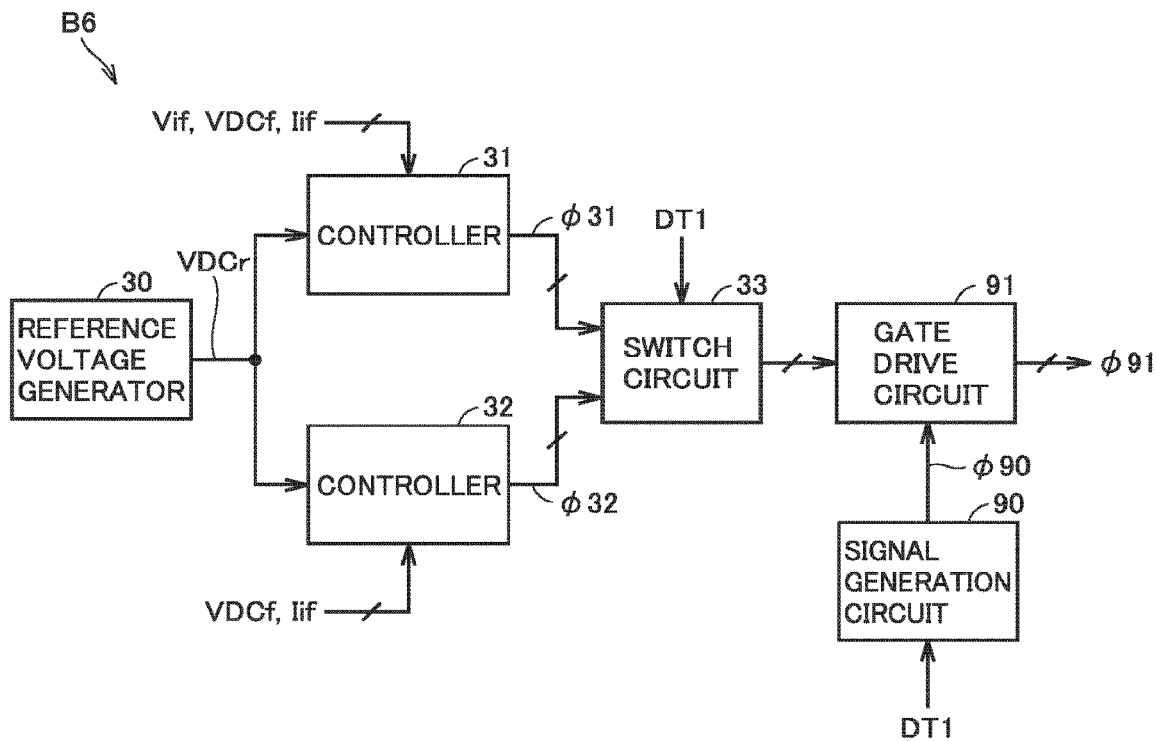
FIG. 14 is a block diagram showing a configuration of a control block included in an uninterruptible power supply according to a third embodiment.

FIG. 14 is a block diagram showing a configuration of a control block B6 included in an uninterruptible power supply according to the third embodiment, which is to be compared with FIG. 4. Referring to FIG. 14, the uninterruptible power supply according to the third embodiment includes control block B6 instead of control block B2 in control circuit 25 (FIG. 2). Control block B6 is different from control block B2 in FIG. 4 in that a signal generation circuit 90 is added and gate drive circuit 34 is replaced with a gate drive circuit 91.

Signal generation circuit 90 has a signal $\phi 90$ rise from the "L" level to the "H" level in response to the edge of falling from the "H" level to the "L" level of power failure detection signal DT1 and thereafter has signal $\phi 90$ fall from the "H" level to the "L" level after lapse of certain time period Td.

During a period during which signal $\phi 90$ is at the "L" level, gate drive circuit 91 operates similarly to gate drive circuit 34 (FIG. 4), and generates a gate signal $\phi 91$ for turning on and off each of IGBT elements Q1R, Q1S, Q1T, Q2R, Q2S, and Q2T in accordance with PWM signal $\phi 31$ or $\phi 32$ from switch circuit 33. This gate signal $\phi 91$ includes gate signals G1R, G2R, G1S, G2S, G1T, and G2T.

During a period during which signal $\phi 90$ is at the "H" level, gate drive circuit 91 sets gate signals G1R, G2R, G1S, G2S, G1T, and G2T together to the "L" level, and maintains IGBT elements Q1R, Q1S, Q1T, Q2R, Q2S, and Q2T in the off state. Therefore, during the period from occurrence of power failure of commercial AC power supply 11 until lapse of time period Td, the operation by converter 1 is stopped.

Figure 15:
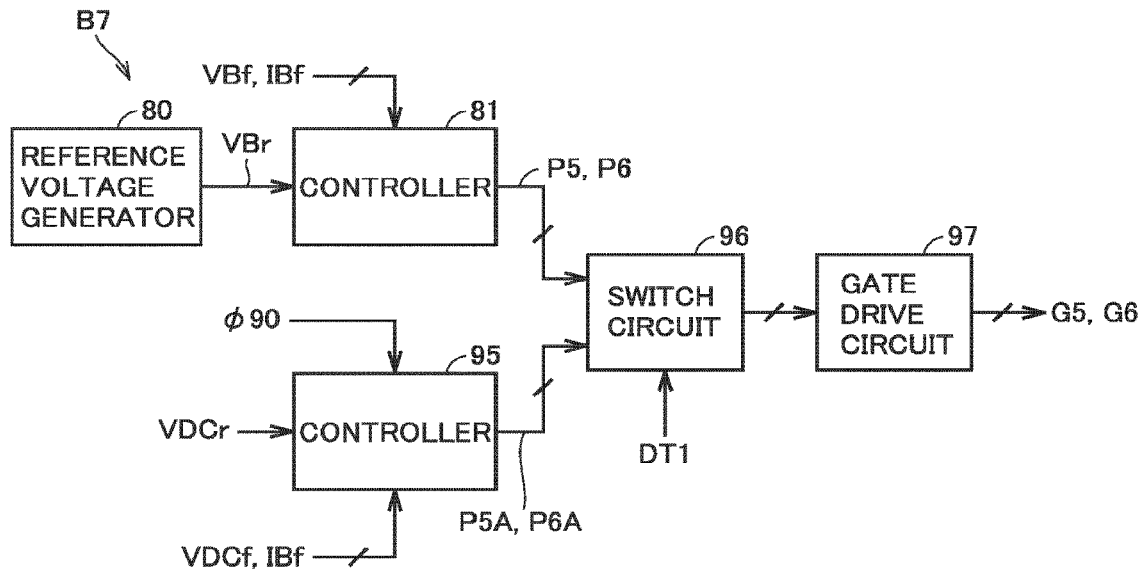
FIG. 15 is a block diagram showing another control block included in an uninterruptible power supply according to a third embodiment.

FIG. 15 is a block diagram showing a control block B7 included in this uninterruptible power supply, which is to be compared with FIG. 11. Referring to FIG. 15, this uninterruptible power supply includes control block B7 instead of control block B4 in control circuit 25 (FIG. 2). Control block B7 is different from control block B4 (FIG. 11) in that a controller 95 and a switch circuit 96 are added and gate drive circuit 82 is replaced with a gate drive circuit 97.

While signal $\phi 90$ (FIG. 14) is at the "H" level, controller 95 generates PWM signals P5A and P6A for controlling chopper circuit 4 such that DC voltage VDC attains to reference voltage VDCr based on output signal VDCf from voltage detector 22 and output signal IBf from current detector 7. PWM signal P6A is an inverted version of PWM signal P5A. While signal $\phi 90$ is at the "H" level, controller 95 maintains both of PWM signals P5A and P6A at the "L" level.

When power failure detection signal DT1 is at the "H" level which is the inactivation level, switch circuit 96 provides PWM signals P5 and P6 from controller 81 to gate drive circuit 97, and when power failure detection signal DT1 is at the "L" level which is the activation level, switch circuit 96 provides PWM signals P5A and P6A from controller 91 to gate drive circuit 97.

Gate drive circuit 97 generates gate signals G5 and G6 for turning on and off IGBT elements Q5 and Q6 in accordance with PWM signals $\emptyset P5$ and P6 or P5A and P6A from switch circuit 96, respectively.

When power failure detection signal DT1 is at the "H" level which is the inactivation level, PWM signals P5 and P6 from controller 81 are provided through switch circuit 96 to gate drive circuit 97. In this case, chopper circuit 4 is controlled as in the first embodiment.

When power failure detection signal DT1 is at the "L" level which is the activation level, PWM signals P5A and P6A from controller 95 are provided through switch circuit 96 to gate drive circuit 97. Gate drive circuit 97 generates gate signals G5 and G6 for turning on and off IGBT elements Q5 and Q6 in accordance with PWM signals P5A and P6A, respectively.

Gate signals G5 and G6 are provided across the gates and the emitters of IGBT elements Q5 and Q6, respectively. Thus, during a period until lapse of certain time period Td since occurrence of power failure, IGBT element Q6 is turned on and turned off at the certain frequency and battery voltage VB is converted to DC voltage VDC.

When IGBT element Q6 is turned off, a current flows from the positive electrode of battery 13 through reactor L7, diode D5, and capacitor Cd to the negative electrode of battery 13. Therefore, even when gate signal G5 is set to the "H" level, IGBT element Q5 is not turned on. When certain time period Td has elapsed since occurrence of power failure, IGBT elements Q5 and Q6 are both turned off and the operation of chopper circuit 4 is stopped.

Figure 16:
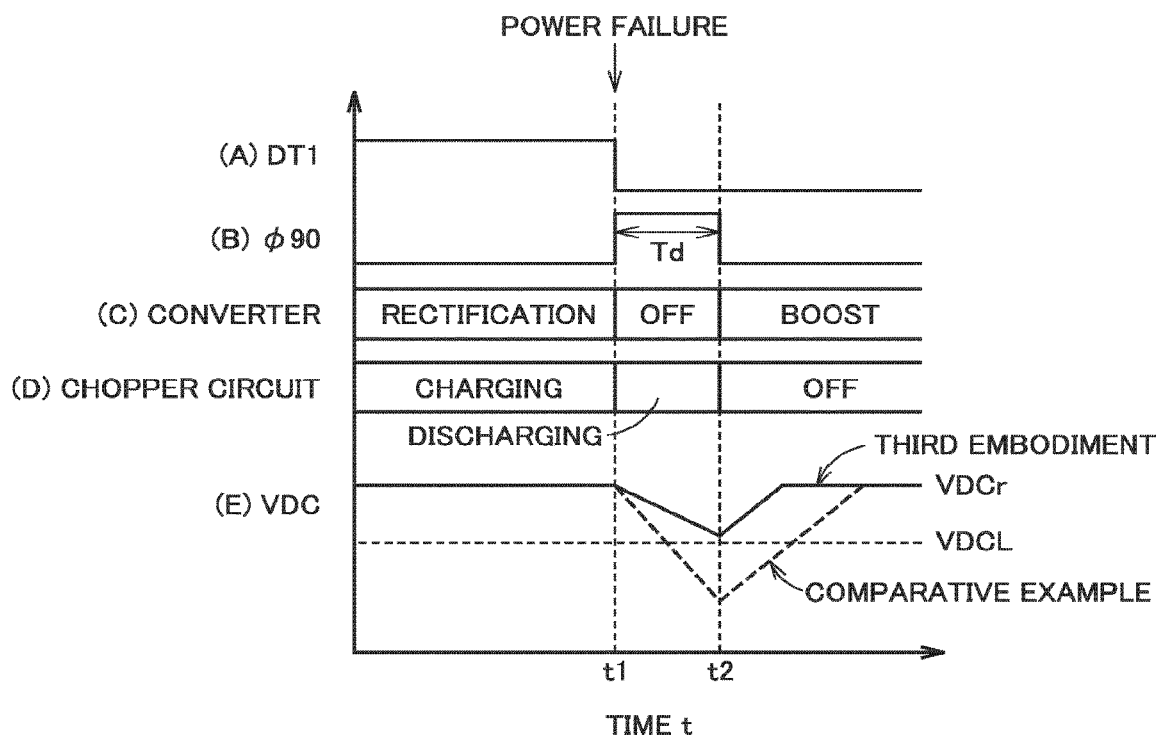
FIG. 16 is a time chart showing an operation of the uninterruptible power supply shown in FIGS. 14 and 15.

FIG. 16 is a time chart showing operations of this uninterruptible power supply. FIG. 16 (A) shows a waveform of power failure detection signal DT1, (B) shows a waveform of signal $\phi 90$, (C) shows an operation of converter 1, and (D) shows an operation of chopper circuit 4. A solid line in (E) represents change over time in DC voltage VDC in the present third embodiment and a dotted line in (E) represents change over time in DC voltage VDC in a comparative example. In the comparative example, a discharging operation of chopper circuit 4 during power failure is not performed.

As shown in FIG. 16, it is assumed that, in an initial state, commercial AC power supply 11 is normal, power failure detector 21 (FIG. 2) sets power failure detection signal DT1 to the "H" level, and signal generation circuit 90 (FIG. 14) sets signal $\phi 90$ to the "L" level.

In this case, in control block B6 (FIG. 14), switch circuit 33 selects controller 31. Reference voltage generator 30, controller 31, and gate drive circuit 91 have converter 1 perform a rectifying operation. DC voltage VDC is maintained at reference voltage VDCr.

In control block B7 (FIG. 15), switch circuit 96 selects controller 81. Reference voltage generator 80, controller 81, and gate drive circuit 97 have chopper circuit 4 perform a charging operation. Battery voltage VB is maintained at reference voltage VBr.

When commercial AC power supply 11 fails at time t1, power failure detector 21 has power failure detection signal DT1 fall from the "H" level to the "L" level and signal generation circuit 90 has signal $\phi 90$ rise from the "L" level to the "H" level.

When power failure detection signal DT1 is set to the "L" level and signal $\phi 90$ is set to the "H" level, in control block B6 (FIG. 14), switch circuit 33 selects controller 32, and PWM signal $\phi 32$ for the boosting operation is provided from controller 32 through switch circuit 33 to gate drive circuit 91. Gate drive circuit 91, however, maintains gate signal $\phi 91$ at the "L" level and the operation of converter 1 is stopped. In control block B7 (FIG. 15), switch circuit 96 selects controller 95, and controller 95 and gate drive circuit 97 (FIG. 15) have chopper circuit 4 perform the discharging operation.

At this time, as shown with the solid line in (E), the operation of converter 1 is stopped, and hence DC voltage VDC lowers. DC power, however, is supplied from chopper circuit 4 to capacitor Cd, and hence lowering in DC voltage VDC is suppressed.

At time t2 after lapse of certain time period Td since occurrence (time t1) of power failure of commercial AC power supply 11, signal generation circuit 90 has signal φ90 fall from the "H" level to the "L" level.

When signal φ90 falls to the "L" level, in control block B6 (FIG. 14), gate drive circuit 91 is activated. Reference voltage generator 30, controller 32, and gate drive circuit 91 have converter 1 perform the boosting operation, and DC voltage VDC increases to attain to reference voltage VDCr. In control block B7 (FIG. 15), controller 95 sets PWM signals P5A and P6A for the discharging operation to the "L" level so that the operation of chopper circuit 4 is stopped.

In the comparative example, the discharging operation by chopper circuit 4 is not performed. Therefore, as shown with the dotted line in (E), when commercial AC power supply 11 fails, DC voltage VDC abruptly lowers and becomes lower than lower limit value VDCL (time t1 to t2). Even when the boosting operation by converter 1 is started at time t2, a time period until DC voltage VDC reaches reference voltage VDCr becomes long.

As set forth above, in this third embodiment, after certain time period Td (≥Toff) equal to or longer than an off time period Toff of switches S1 to S3 has elapsed since occurrence of power failure of commercial AC power supply 11, the boosting operation by converter 1 is started. Therefore, even in the example where switches S1 to S3 are implemented by mechanical switches, an overcurrent can be prevented from flowing due to short-circuiting of leg circuits 1a to 1c by the three-phase transformer in the final stage of commercial AC power supply 11 with switches S1 to S3 being interposed when converter 1 performs the boosting operation.

During a period until lapse of certain time period Td (≥Toff) since occurrence of power failure of commercial AC power supply 11, the discharging operation by chopper circuit 4 is performed. Therefore, lowering in DC voltage VDC during the period during which the operation by converter 1 remains stopped can be suppressed and DC voltage VDC can be prevented from becoming lower than lower limit value VDCL. Therefore, waveforms of AC output voltages VU, VV, and VW from inverter 3 can be prevented from being distorted, and three-phase AC voltages VU, VV, and VW having a stable waveform can be supplied to load 12.

Since rated power of chopper circuit 4 is lower than that of each of converter 1 and inverter 3, during the discharging operation, chopper circuit 4 is overloaded. Time period Td during which chopper circuit 4 is caused to perform the discharging operation, however, is shorter than one second. Therefore, even when chopper circuit 4 is overloaded, it does not break.

Fourth Embodiment

When switches S1 to S3 are turned on while capacitor Cd has not at all been charged in the uninterruptible power supply in the first embodiment, a rush current flows from commercial AC power supply 11 through switches S1 to S3, reactors L1 to L3, and diodes DIR, DIS, D1T, D2R, D2S, and D2T into capacitor Cd, and switches S1 to S3 and the like may break.

Even in an example in which capacitor Cd has been charged, when switches S4 to S6 are turned on during power failure of commercial AC power supply 11, the rush current flows from battery 13 through switches S4 to S6 into capacitors C1 to C3 and switches S4 to S6 may break. The present fourth embodiment solves this problem.

Figure 17:
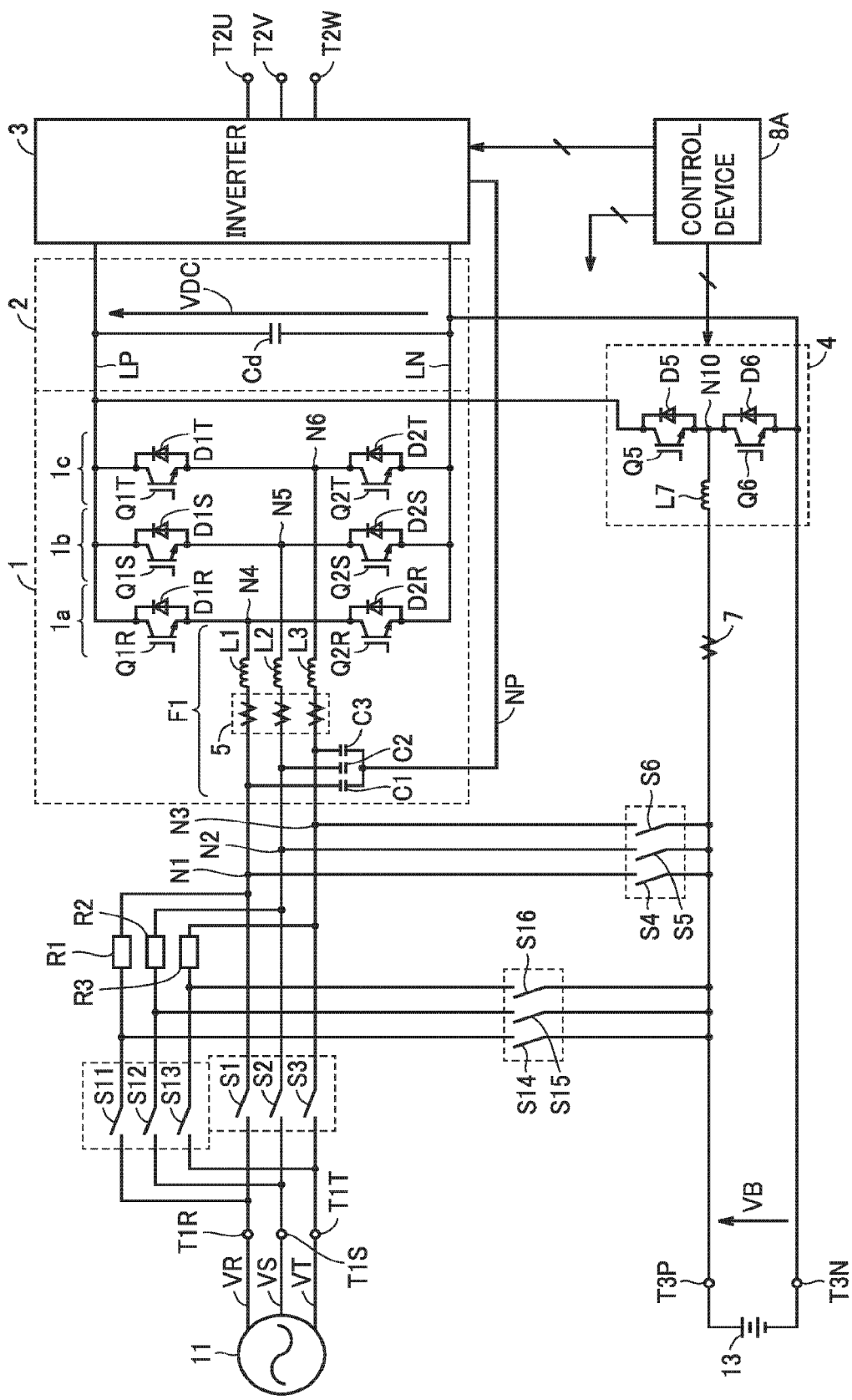
FIG. 17 is a circuit block diagram showing a configuration of an uninterruptible power supply according to the fourth embodiment.

FIG. 17 is a circuit block diagram showing a main part of an uninterruptible power supply according to the fourth embodiment, which is to be compared with FIG. 1. Referring to FIG. 17, this uninterruptible power supply is different from the uninterruptible power supply in FIG. 1 in that switches S11 to S16 and resistors R1 to R3 are added and control device 8 is replaced with a control device 8A.

Switches S11 to S13 have one terminals connected to AC input terminals T1R, T1S, and T1T, respectively. Resistors R1 to R3 have one terminals connected to the other terminals of switches S11 to S13, respectively, and have the other ends connected to nodes N1 to N3, respectively. Switches S14 to S16 have one terminals connected together to battery terminal T3P and have the other terminals connected to one terminals of resistors R1 to R3, respectively. Switches S1 to S6 and S11 to S16 are controlled by control device 8A.

While operations of the uninterruptible power supply remain stopped, all switches S1 to S6 and S11 to S16 are turned off and operations of converter 1, inverter 3, and chopper circuit 4 are stopped. When control device 8A starts up the uninterruptible power supply, it initially turns on switches S11 to S13.

When switches S11 to S13 are turned on, a current flows from commercial AC power supply 11 through switches S11 to S13, resistors R1 to R3, reactors L1 to L3, and diodes DIR, DIS, D1T, D2R, D2S, and D2T to capacitor Cd and charging of capacitor Cd is started. At this time, resistors R1 to R3 restrict the current that flows into capacitor Cd so that the rush current is prevented from flowing into capacitor Cd.

At timing when DC voltage VDC sufficiently increases, control device 8A turns on switches S1 to S3 and thereafter turns off switches S11 to S13 and quits initial charging of capacitor Cd. Then, control device 8A controls converter 1 and chopper circuit 4 to operate to charge battery 13, and controls inverter 3 to operate to drive load 12.

When commercial AC power supply 11 fails, control device 8A turns off switches S1 to S3 and turns on switches S14 to S16. As switches S14 to S16 are turned on, a current flows from battery 13 through switches S14 to S16 and resistors R1 to R3 to capacitors C1 to C3 so that capacitors C1 to C3 are charged. At this time, the current that flows into capacitors C1 to C3 is restricted by resistors R1 to R3, so that the rush current is prevented from flowing into capacitors C1 to C3.

At timing when capacitors C1 to C3 are sufficiently charged, control device 8A turns on switches S4 to S6 and turns off switches S14 to S16. Battery voltage VB is thus supplied from battery 13 through switches S4 to S6 to converter 1. Then, control device 8A has converter 1 perform the boosting operation to convert battery voltage VB into DC voltage VDC. Since the configuration and the operations are otherwise the same as in the first embodiment, description thereof will not be repeated.

As set forth above, the fourth embodiment can prevent the rush current from flowing from commercial AC power supply 11 and battery 13 into the uninterruptible power supply.

Fifth Embodiment

Figure 18:
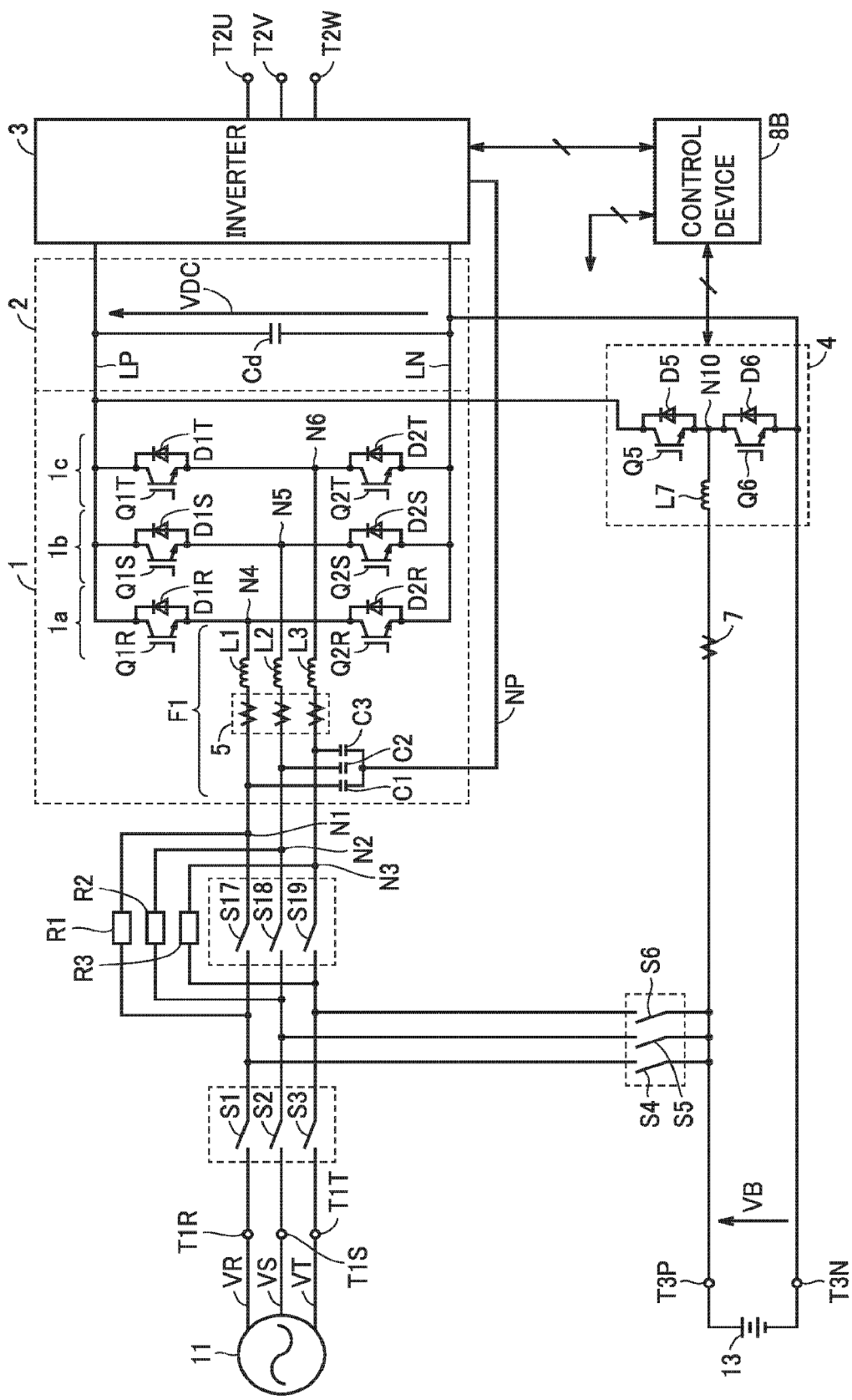
FIG. 18 is a circuit block diagram showing a configuration of an uninterruptible power supply according to a fifth embodiment.

This fifth embodiment also solves the problem the same as in the fourth embodiment. FIG. 18 is a circuit block diagram showing a main part of an uninterruptible power supply according to the fifth embodiment, which is to be compared with FIG. 1. Referring to FIG. 18, this uninterruptible power supply is different from the uninterruptible power supply in FIG. 1 in that switches S17 to S19 and resistors R1 to R3 are added and control device 8 is replaced with a control device 8B.

Switches S17 to S19 have one terminals connected to the other electrodes of switches S1 to S3, respectively, and have the other terminals connected to nodes N1 to N3, respectively. Resistors R1 to R3 are connected in parallel to switches S17 to S19, respectively. Switches S4 to S6 have one terminals connected together to battery terminal T3P and have the other terminals connected to one terminals of switches S17 to S19, respectively. Switches S1 to S6 and S17 to S19 are controlled by control device 8B.

While operations of the uninterruptible power supply remain stopped, all switches S1 to S6 and S17 to S19 are turned off and operations of converter 1, inverter 3, and chopper circuit 4 are stopped. When control device 8B starts up the uninterruptible power supply, it initially turns on switches S1 to S3.

As switches S1 to S3 are turned on, a current flows from commercial AC power supply 11 through switches S1 to S3, resistors R1 to R3, reactors L1 to L3, and diodes D1R, D1S, D1T, D2R, D2S, and D2T to capacitor Cd, so that initial charging of capacitor Cd is started. At this time, resistors R1 to R3 restrict the current that flows into capacitor Cd and the rush current is prevented from flowing into capacitor Cd.

At timing when DC voltage VDC sufficiently increases, control device 8B turns on switches S17 to S19. Thus, the current flows from commercial AC power supply 11 through switches S1 to S3, switches S17 to S19, reactors L1 to L3, and diodes D1R, D1S, D1T, D2R, D2S, and D2T to capacitor Cd, and initial charging of capacitor Cd ends. Then, control device 8B controls converter 1 and chopper circuit 4 to operate to charge battery 13 and thereafter controls inverter 3 to operate to drive load 12.

When commercial AC power supply 11 fails, control device 8B turns off switches S1 to S3 and S17 to S19 and turns on switches S4 to S6. As switches S4 to S6 are turned on, a current flows from battery 13 through switches S4 to S6 and resistors R1 to R3 to capacitors C1 to C3 so that capacitors C1 to C3 are charged. At this time, the current that flows into capacitors C1 to C3 is restricted by resistors R1 to R3, and the rush current is prevented from flowing into capacitors C1 to C3.

At timing when capacitors C1 to C3 are sufficiently charged, control device 8B turns on switches S17 to S19. Battery voltage VB is thus supplied from battery 13 through switches S4 to S6 and S17 to S19 to converter 1. Then, control device 8B controls converter 1 to perform the boosting operation to convert battery voltage VB into DC voltage VDC. Since the configuration and the operations are otherwise the same as in the first embodiment, description thereof will not be repeated.

As set forth above, in the fifth embodiment, as in the fourth embodiment, the rush current can be prevented from flowing from commercial AC power supply 11 and battery 13 into the uninterruptible power supply.

The number of switches can be smaller and the apparatus can be smaller in size than in the fourth embodiment. Since the current constantly flows through switches S17 to S19 while commercial AC power supply 11 is normal, loss is caused in switches S17 to S19 and efficiency of the uninterruptible power supply may become lower.

Sixth Embodiment

Figure 19:
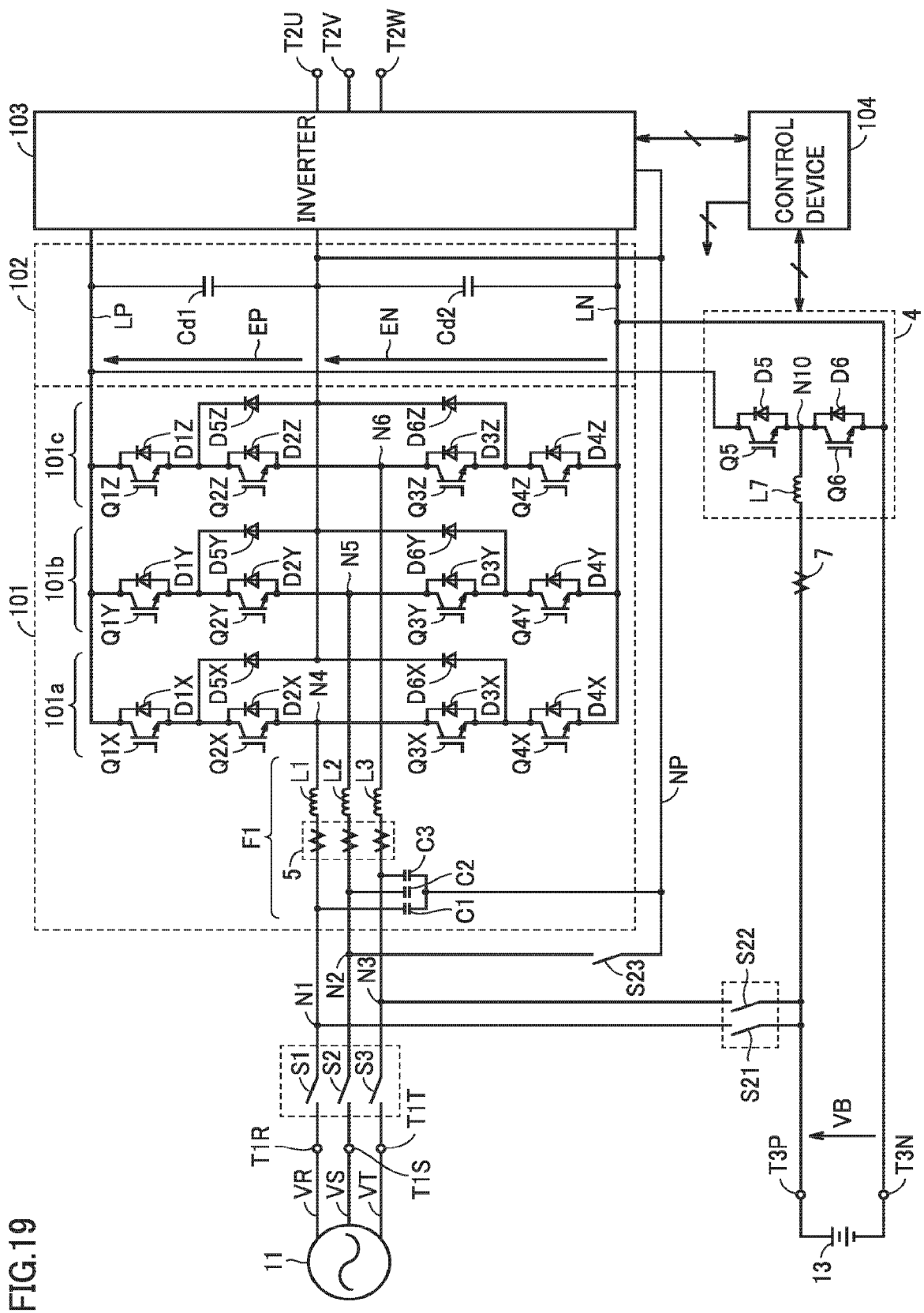
FIG. 19 is a circuit block diagram showing a configuration of an uninterruptible power supply according to a sixth embodiment.

FIG. 19 is a circuit block diagram showing a configuration of an uninterruptible power supply according to a sixth embodiment, which is to be compared with FIG. 1. Referring to FIG. 19, this uninterruptible power supply is different from the uninterruptible power supply in FIG. 1 in that switches S4 to S6 are replaced with switches S21 to S23, and converter 1, DC link portion 2, inverter 3, and control device 8 are replaced with a converter 101, a DC link portion 102, an inverter 103, and a control device 104, respectively.

Switches S21 and S22 (first switches) have one terminals together connected to battery terminal T3P and have the other terminals connected to nodes N1 and N3, respectively. Switch S23 has one terminal connected to neutral point NP and has the other terminal connected to node N2. Switches S21 to S23 are controlled by control device 104.

In this uninterruptible power supply, during power failure of commercial AC power supply 11, a boosting operation and a balancing operation are performed. The boosting operation and the balancing operation will be described in detail later. During power failure of commercial AC power supply 11, switches S21 to S23 are turned on. While commercial AC power supply 11 is normal, switches S21 to S23 are turned off. Switches S21 and S22 correspond to one embodiment of the "first switch" connected between the power storage device (battery 13) and the power supply terminal (nodes N1 and N3). Switch S23 corresponds to one embodiment of the "second switch" connected between the power supply terminal (node N2) and neutral point NP.

Therefore, while commercial AC power supply 11 is normal, nodes N1 to N3 receive three-phase AC voltages VR, VS, and VT from commercial AC power supply 11 through switches S1 to S3, respectively. During power failure of commercial AC power supply 11, nodes N1 and N3 both receive battery voltage VB from battery 13 through switches S21 and S22 and node N2 is connected to neutral point NP with switch S23 being interposed.

DC link portion 102 is provided to supply and receive DC power among converter 101, inverter 103, and chopper circuit 4. DC link portion 102 includes DC lines LP and LN and capacitors Cd1 and Cd2 (first and second sub capacitors). Capacitors Cd1 and Cd2 are equal to each other in capacitance value.

Capacitors Cd1 and Cd2 are connected in series between DC lines LP and LN and smoothen DC voltage VDC between DC lines LP and LN. A node between capacitors Cd1 and Cd2 is connected to neutral point NP. DC line LN is connected to battery terminal T3N. Control device 104 detects a voltage EP across terminals of capacitor Cd1 and a voltage EN across terminals of capacitor Cd2.

Control device 104 controls converter 101. While commercial AC power supply 11 is normal, converter 101 converts AC power supplied from commercial AC power supply 11 through switches S1 to S3 into DC power to supply resultant DC power to DC link portion 102.

During power failure of commercial AC power supply 11, converter 101 supplies DC power supplied from battery 13 through switches S21 and S22 to DC link portion 102.

During power failure of commercial AC power supply 11, converter 101 supplies and receives DC power between capacitors Cd1 and Cd2 such that voltage EP across terminals of capacitor Cd1 is equal to voltage EN across terminals of capacitor Cd2.

Specifically, converter 101 includes AC filter F1 and leg circuits 101a to 101c. The configuration of AC filter F1 is as described with reference to FIG. 1, and AC filter F1 includes capacitors C1 to C3 and reactors L1 to L3.

Leg circuits 101a, 101b, and 101c are provided in correspondence with the R phase, the S phase, and the T phase, respectively. Leg circuit 101a includes IGBT elements Q1X to Q4X and diodes D1X to D6X. Leg circuit 101b includes IGBT elements Q1Y to Q4Y and diodes D1Y to D6Y. Leg circuit 101c includes IGBT elements Q1Z to Q4Z and diodes D1Z to D6Z.

IGBT elements Q1X to Q4X are connected in series between DC lines LP and LN. IGBT element Q2X has the emitter connected to node N4. Diodes D1X to D4X are connected in anti-parallel to IGBT elements Q1X to Q4X, respectively. Diode D6X has the anode connected to the emitter of IGBT element Q3X and has the cathode connected to neutral point NP. Diode D5X has the anode connected to neutral point NP and has the cathode connected to the emitter of IGBT element Q1X.

IGBT elements Q1Y to Q4Y are connected in series between DC lines LP and LN. IGBT element Q2Y has the emitter connected to node N5. Diodes D1Y to D4Y are connected in anti-parallel to IGBT elements Q1Y to Q4Y, respectively. Diode D6Y has the anode connected to the emitter of IGBT element Q3Y and has the cathode connected to neutral point NP. Diode D5Y has the anode connected to neutral point NP and has the cathode connected to the emitter of IGBT element Q1Y.

IGBT element Q1Z to Q4Z are connected in series between DC lines LP and LN. IGBT element Q2Z has the emitter connected to node N6. Diodes D1Z to D4Z are connected in anti-parallel to IGBT elements Q1Z to Q4Z, respectively. Diode D6Z has the anode connected to the emitter of IGBT element Q3Z and has the cathode connected to neutral point NP. Diode D5Z has the anode connected to neutral point NP and has the cathode connected to the emitter of IGBT element Q1Z.

IGBT elements Q1X, Q1Y, and Q1Z may representatively collectively be referred to as IGBT element Q1. IGBT elements Q2X, Q2Y, and Q2Z may representatively collectively be referred to as IGBT element Q2. IGBT elements Q3X, Q3Y, and Q3Z may representatively collectively be referred to as IGBT element Q3. IGBT elements Q4X, Q4Y, and Q4Z may representatively collectively be referred to as IGBT element Q4. IGBT elements Q1 and Q2 implement a first switching element. IGBT elements Q3 and Q4 implement a second switching element.

Diodes D1X, D1Y, and D1Z may representatively collectively be referred to as diode D1. Diodes D2X, D2Y, and D2Z may representatively collectively be referred to as diode D2. Diodes D3X, D3Y, and D3Z may representatively collectively be referred to as diode D3. Diodes D4X, D4Y, and D4Z may representatively collectively be referred to as diode D4. Diodes D5X, D5Y, and D5Z may representatively collectively be referred to as diode D5. Diodes D6X, D6Y, and D6Z may representatively collectively be referred to as diode D6.

Diodes D1 and D2 implement a first diode. Diodes D3 and D4 implement a second diode. Each of diodes D1 to D4 operates as a freewheeling diode. Each of diodes D5 and D6 operates as a clamp diode.

While commercial AC power supply 11 is normal, three-phase AC voltages VR, VS, and VT are supplied from commercial AC power supply 11 through switches S1 to S3 to converter 101. Three-phase AC voltages VR, VS, and VT are subjected to three-phase full-wave rectification by diodes D1X to D4X, D1Y to D4Y, and D1Z to D4Z, and furthermore, they are smoothened by capacitors Cd1 and Cd2 and converted to DC voltage VDC.

Control device 104 controls leg circuits 101a to 101c such that DC voltage VDC=EP+EN attains to reference voltage VDCr based on three-phase AC voltages VR, VS, and VT, three-phase AC currents I1 to I3, and DC voltages EP and EN.

Specifically, in a first mode, control device 104 turns on IGBT element Q2, alternately turns on IGBT elements Q1 and Q3 at a switching frequency, and adjusts the on time period of IGBT element Q1 (that is, the off time period of IGBT element Q3) within one cycle.

For example, in leg circuit 101a, when IGBT element Q1X is turned on, DC line LP is connected to node N4 with IGBT elements Q1X and Q2X being interposed, so that a positive voltage is supplied to node N4. When IGBT element Q3X is turned on, node N4 is connected to neutral point NP with IGBT element Q3X and diode D6X being interposed and neutral point NP is connected to node N4 with diode D5X and IGBT element Q2X being interposed, so that an intermediate voltage is supplied to node N4.

In a second mode, control device 104 turns on IGBT element Q3, alternately turns on IGBT elements Q4 and Q2 at a switching frequency, and adjusts the on time period of IGBT element Q4 (that is, the off time period of IGBT element Q2) within one cycle. For example, in leg circuit 101a, when IGBT element Q4X is turned on, node N4 is connected to DC line LN with IGBT elements Q3X and Q4X being interposed so that a negative voltage is supplied to node N4. When IGBT element Q3X is turned on, node N4 is connected to neutral point NP with IGBT element Q3X and diode D6X being interposed and neutral point NP is connected to node N4 with diode D5X and IGBT element Q2X being interposed, so that an intermediate voltage is supplied to node N4.

Control device 104 converts DC voltages EP and EN into AC voltage VRct at three levels by alternately executing the first and second modes. In leg circuits 101b and 101c as well, as in leg circuit 101a, DC voltage VDC is converted to AC voltages VSct and VTct each at three levels.

Control device 104 controls phases of three-phase AC voltages VRct, VSct, and VTct such that DC voltage VDC=EP+EN attains to reference voltage VDCr. As the phases of three-phase AC voltages VRct, VSct, and VTct are advanced as compared with phases of three-phase AC voltages VR, VS, and VT from commercial AC power supply 11, electric power is supplied from capacitors Cd1 and Cd2 through converter 101 to commercial AC power supply 11 and DC voltage VDC lowers.

In contrast, as the phases of three-phase AC voltages VRct, VSct, and VTct are retarded as compared with the phases of three-phase AC voltages VR, VS, and VT from commercial AC power supply 11, electric power is supplied from commercial AC power supply 11 through converter 101 to capacitors Cd1 and Cd2 and DC voltage VDC increases. Therefore, DC voltage VDC is maintained at reference voltage VDCr.

During power failure of commercial AC power supply 11, battery voltage VB is supplied from battery 13 through switches S21 and S22 to nodes N1 and N3. Control device 104 turns on and off IGBT elements Q3 and Q4 at a certain frequency in leg circuits 101a and 101c such that DC voltage VDC attains to reference voltage VDCr based on currents I1 and I3 and DC voltage VDC.

In other words, control device 104 turns on and off IGBT elements Q3X and Q4X at a certain frequency in leg circuit 101a. As IGBT elements Q3X and Q4X are turned on, a current flows from the positive electrode of battery 13 through switch S21, reactor L1, IGBT elements Q3X and Q4X, and DC line LN to the negative electrode of battery 13, so that electromagnetic energy is stored in reactor L1.

As IGBT elements Q3X and Q4X are turned off, a current flows from the positive electrode of battery 13 through switch S21, reactor L1, diodes D2X and D1X, DC line LP, capacitors Cd1 and Cd2, and DC line LN to the negative electrode of battery 13, so that capacitors Cd1 and Cd2 are charged.

At this time, since electromagnetic energy in reactor L1 is emitted, DC voltage VDC becomes higher than battery voltage VB. In other words, battery voltage VB is boosted and converted to DC voltage VDC.

Control device 104 turns on and off IGBT elements Q3Z and Q4Z at a certain frequency in leg circuit 101c. As IGBT elements Q3Z and Q4Z are turned on, a current flows from the positive electrode of battery 13 through switch S22, reactor L3, IGBT elements Q3Z and Q4Z, and DC line LN to the negative electrode of battery 13, so that electromagnetic energy is stored in reactor L3.

As IGBT elements Q3Z and Q4Z are turned off, a current flows from the positive electrode of battery 13 through switch S22, reactor L3, diodes D2Z and D1Z, DC line LP, capacitors Cd1 and Cd2, and DC line LN to the negative electrode of battery 13, so that capacitors Cd1 and Cd2 are charged.

At this time, since electromagnetic energy in reactor L3 is emitted, DC voltage VDC becomes higher than battery voltage VB. In other words, battery voltage VB is boosted and converted to DC voltage VDC.

Control device 104 adjusts the on time period of IGBT elements Q3 and Q4 within one cycle of a signal that turns on and off IGBT elements Q3 and Q4 in leg circuits 101a and 101c such that DC voltage VDC attains to reference voltage VDCr. For example, as the on time period of IGBT elements Q3X and Q4X is made longer in leg circuit 101a, electromagnetic energy stored in reactor L1 increases and DC voltage VDC increases.

In contrast, as the on time period of IGBT elements Q3X and Q4X is made shorter, electromagnetic energy stored in reactor L1 decreases and DC voltage VDC lowers. In leg circuit 101c as well, as in leg circuit 101a, the level of DC voltage VDC is adjusted. Therefore, DC voltage VDC is maintained at reference voltage VDCr.

Control device 104 sets the signal that turns on and off IGBT elements Q3X and Q4X and the signal that turns on and off IGBT elements Q3Z and Q4Z to be 180-degree out of phase with each other. Thus, diodes D2X and D1X and diodes D2Z and D1Z can be turned on at timings different from each other, and timings of supply of DC power from battery 13 through diodes D2X and D1X and diodes D2Z and D1Z to DC link portion 102 can be different from each other. Therefore, a ripple voltage caused in DC voltage VDC during power failure of commercial AC power supply 11 can be reduced.

The sum of currents I1 and I3 that flow through reactors L1 and L3 at this time corresponds to the output current from battery 13. In the present sixth embodiment, a ripple in the output current from battery 13 can be made smaller. Therefore, the ripple in the output current from battery 13 can be reduced by reactors L1 and L3 small in size and increase in size of the apparatus can be suppressed.

Control device 104 controls converter 101 to perform the balancing operation such that DC voltages EP and EN are equal to each other during power failure of commercial AC power supply 11. During the balancing operation, switches S1 to S3 are turned off and switches S21 to S23 are turned on.

During the balancing operation, control device 104 alternately turns on IGBT elements Q1Y and Q2Y and IGBT elements Q3Y and Q4Y at a certain frequency in leg circuit 101b.

As IGBT elements Q1Y and Q2Y are turned on, a current flows from the positive electrode of capacitor Cd1 through DC line LP, IGBT elements Q1Y and Q2Y, node N5, reactor L2, switch S23, and neutral point NP to the negative electrode of capacitor Cd1, so that electromagnetic energy is stored in reactor L2.

As IGBT elements Q1Y and Q2Y are turned off, a current flows from node N5 through reactor L2, switch S23, neutral point NP, capacitor Cd2, DC line LN, and diodes D4Y and D3Y to node N5 so that electromagnetic energy in reactor L2 is emitted and capacitor Cd2 is charged.

As IGBT elements Q3Y and Q4Y are turned on, a current flows from the positive electrode of capacitor Cd2 through neutral point NP, switch S23, reactor L2, IGBT elements Q3Y and Q4Y, and DC line LN to the negative electrode of capacitor Cd2 so that electromagnetic energy is stored in reactor L2.

As IGBT elements Q3Y and Q4Y are turned off, a current flows from node N5 through diodes D2Y and D1Y, DC line LP, capacitor Cd1, neutral point NP, switch S23, and reactor L2 to node N5 so that electromagnetic energy in reactor L2 is emitted and capacitor Cd1 is charged.

When a condition of EP>EN is satisfied, DC power is supplied from capacitor Cd1 through reactor L2 to capacitor Cd2 so that DC voltage EP decreases and DC voltage EN increases. In contrast, when a condition of EP<EN is satisfied, DC power is supplied from capacitor Cd2 through reactor L2 to capacitor Cd1 so that DC voltage EP increases and DC voltage EN decreases. Therefore, as a result of the balancing operation, magnitude of a difference ΔE=EP−EN between DC voltages EP and EN can be decreased.

Inverter 103 is controlled by control device 104. Inverter 103 converts DC power supplied from converter 101 through DC link portion 102 into AC power at the commercial frequency and supplies resultant AC power to load 12.

Inverter 103 is similar in configuration to converter 101, and converts DC voltages EP and EN into three-phase AC voltages VU, VV, and VW at three levels and supply resultant AC voltages to load 12. Inverter 103 may be a circuit that converts DC voltage VDC=EP+EN into three-phase AC voltages VU, VV, and VW at two levels, similarly to inverter 3 (FIG. 1).

Chopper circuit 4 is controlled by control device 104. While commercial AC power supply 11 is normal, chopper circuit 4 allows DC power generated by converter 101 to be stored in battery 13. The configuration of chopper circuit 4 is as described with reference to FIG. 1.

Figure 20:
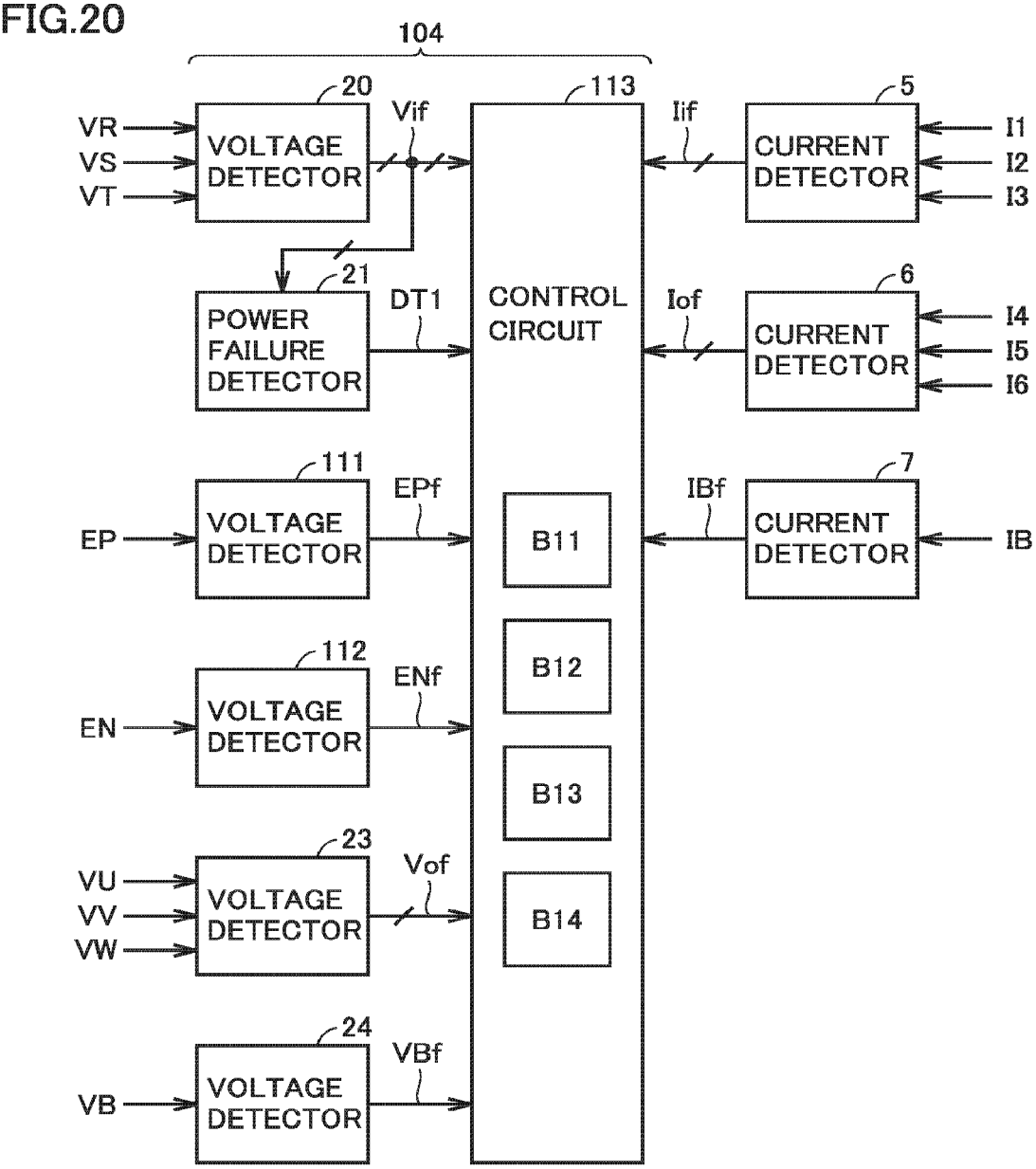
FIG. 20 is a block diagram showing a configuration of a control device shown in FIG. 19.

FIG. 20 is a block diagram showing a configuration of control device 104, which is to be compared with FIG. 2. Referring to FIG. 20, control device 104 is different from control device 8 in that voltage detector 22 is replaced with voltage detectors 111 and 112 and control circuit 25 is replaced with a control circuit 113.

Voltage detector 111 detects voltage EP across terminals of capacitor Cd1 and provides a signal EPf indicating a detection value thereof to control circuit 113. Voltage detector 112 detects voltage EN across terminals of capacitor Cd2 and provides a signal ENf indicating a detection value thereof to control circuit 113.

Control circuit 113 controls switches S1 to S3 and S21 to S23, converter 101, inverter 103, and chopper circuit 4 based on output signals Vif, Vof, VBf, EPf, and ENf from respective voltage detectors 20, 23, 24, 111, and 112, output signals Iif, Iof, and IBf from respective current detectors 5, 6, and 7, and output signal DT1 from power failure detector 21.

Control circuit 113 includes control blocks B11 to B14. Control block B11 controls switches S1 to S3 and S21 to S23. Control block B12 controls converter 101. Control block B13 controls inverter 103. Control block B14 is the same in configuration as control block B4 and controls chopper circuit 4.

Figure 21:
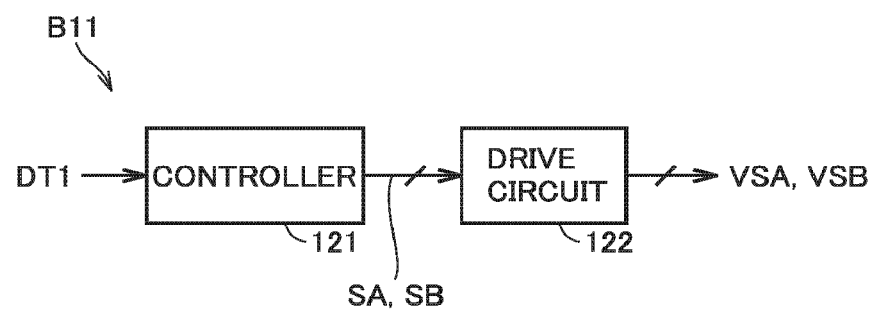
FIG. 21 is a block diagram showing a configuration of a control block B11 shown in FIG. 20.

FIG. 21 is a block diagram showing a configuration of control block B11 (FIG. 20). In FIG. 21, control block B11 includes a controller 121 and a drive circuit 122.

Controller 121 generates signal SA for controlling switches S1 to S3 and signal SB for controlling switches S21 to S23 based on power failure detection signal DT1.

When power failure detection signal DT1 is at the "H" level which is the inactivation level, signal SA is set to the "H" level and signal SB is set to the "L" level. When power failure detection signal DT1 is at the "L" level which is the activation level, signal SA is set to the "L" level and signal SB is set to the "H" level.

Drive circuit 122 generates control voltages VSA and VSB in accordance with signals SA and SB. As signals SA and SB are set to the "H" level, control voltages VSA and VSB are set to the "H" level. As signals SA and SB are set to the "L" level, control voltages VSA and VSB are set to the "L" level.

As control voltage VSA is set to the "H" level, switches S1 to S3 are turned on, and when control voltage VSA is set to the "L" level, switches S1 to S3 are turned off. As control voltage VSB is set to the "H" level, switches S21 to S23 are turned on, and when control voltage VSB is set to the "L" level, switches S21 to S23 are turned off.

Therefore, while commercial AC power supply 11 is normal, switches S1 to S3 are turned on and switches S21 to S23 are turned off. During power failure of commercial AC power supply 11, switches S1 to S3 are turned off and switches S21 to S23 are turned on.

Figure 22:
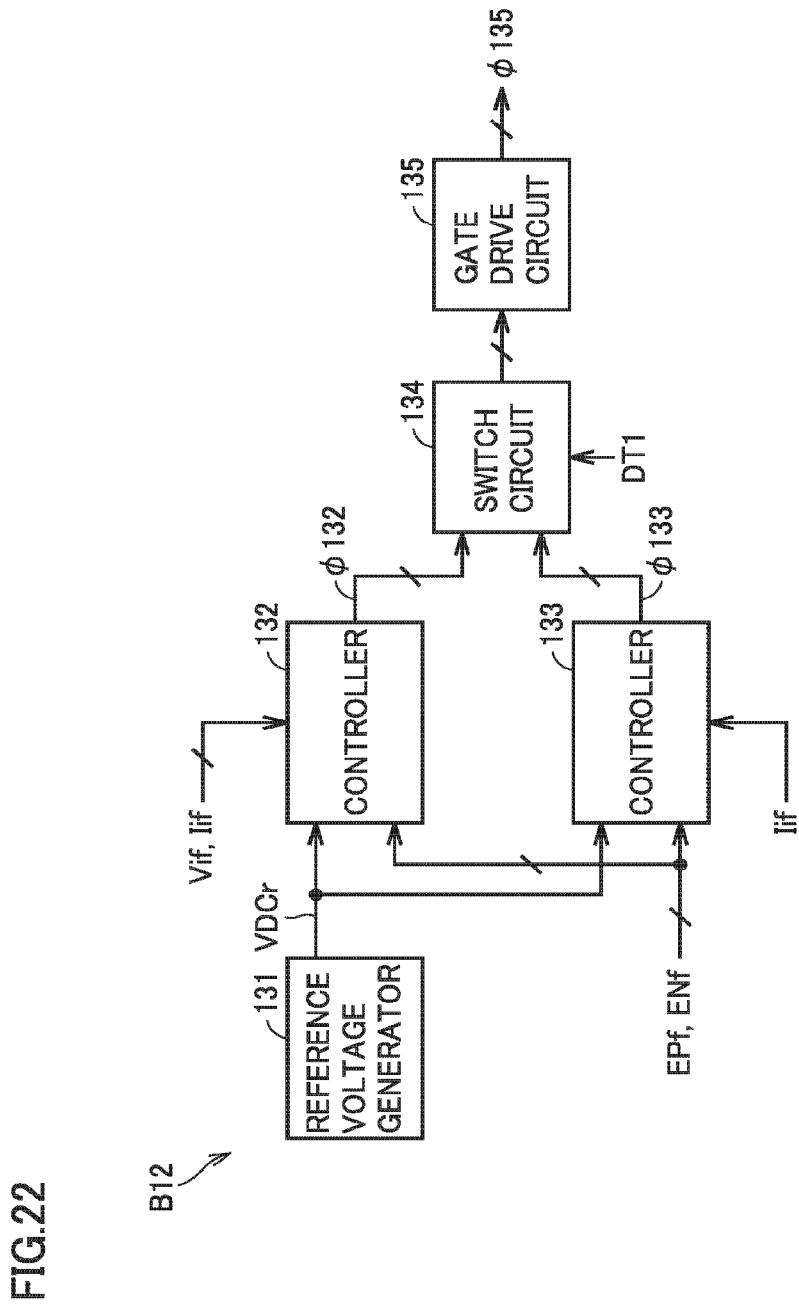
FIG. 22 is a block diagram showing a configuration of a control block B12 shown in FIG. 20.

FIG. 22 is a block diagram showing a configuration of control block B12 (FIG. 20). In FIG. 22, control block B12 includes a reference voltage generator 131, controllers 132 and 133, a switch circuit 134, and a gate drive circuit 135.

Reference voltage generator 131 generates reference voltage VDCr.

Controller 132 generates a PWM signal $\phi132$ for converting three-phase AC voltages VR, VS, and VT into DC voltage VDC based on reference voltage VDCr, output signals Vif, EPf, and ENf from respective voltage detectors 20, 111, and 112, and output signal Iif from current detector 5. PWM signal $\phi132$ includes PWM signals P1X to P4X, P1Y to P4Y, and P1Z to P4Z for controlling IGBT elements Q1X to Q4X, Q1Y to Q4Y and Q1Z to Q4Z, respectively.

Controller 133 generates a PWM signal $\phi133$ for boosting battery voltage VB to generate DC voltage VDC based on reference voltage VDCr, output signals EPf and ENf from respective voltage detectors 111 and 112, and output signal Iif from current detector 5. PWM signal $\phi133$ includes PWM signals P1XA to P4XA, P1YA to P4YA, and P1ZA to P4ZA for controlling IGBT elements Q1X to Q4X, Q1Y to Q4Y, and Q1Z to Q4Z, respectively.

When power failure detection signal DT1 is at the "H" level which is the inactivation level, switch circuit 134 provides PWM signal $\phi132$ from controller 132 to gate drive circuit 135, and when power failure detection signal DT1 is at the "L" level which is the activation level, switch circuit 134 provides PWM signal $\phi133$ from controller 133 to gate drive circuit 135.

Gate drive circuit 135 generates a gate signal $\phi135$ in accordance with PWM signal $\phi132$ or $\phi133$ from switch circuit 134. Gate signal $\phi135$ includes gate signals G1X to G4X, G1Y to G4Y, and G1Z to G4Z for turning on and off IGBT elements Q1X to Q4X, Q1Y to Q4Y, and Q1Z to Q4Z, respectively.

Figure 23:
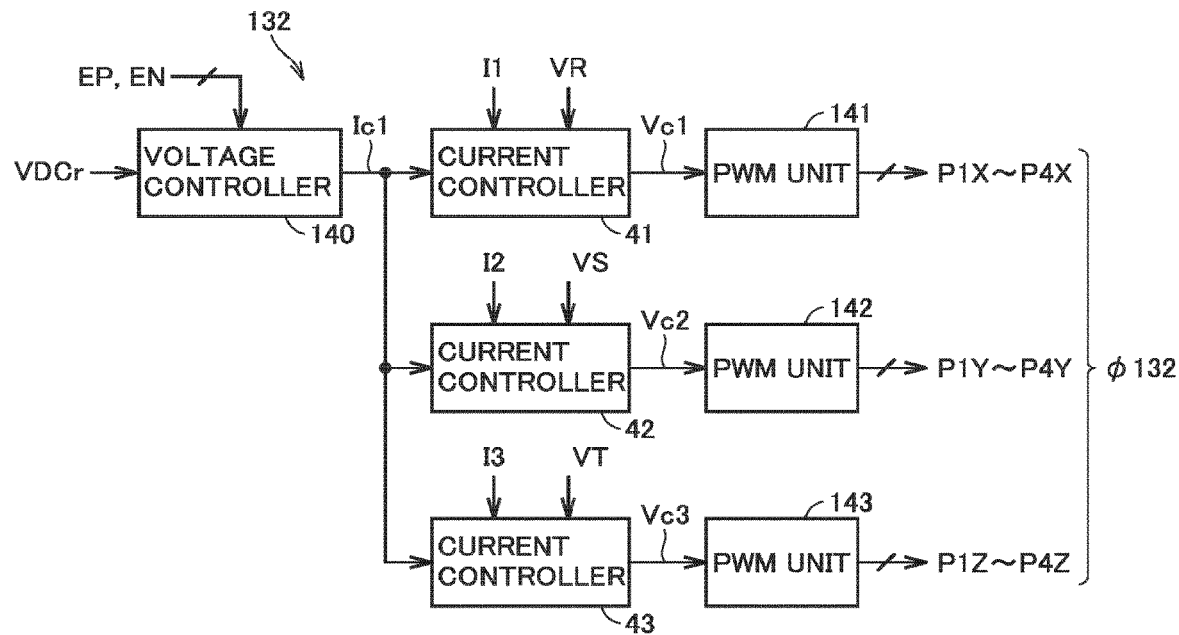
FIG. 23 is a block diagram showing a configuration of a controller 132 shown in FIG. 22.

FIG. 23 is a block diagram showing a configuration of controller 132 (FIG. 22), which is to be compared with FIG. 5. Referring to FIG. 23, controller 131 includes a voltage controller 140 which is a substitute for voltage controller 40 of controller 31 and includes PWM units 141 to 143 which are substitutes for PWM units 44 to 46 of controller 31.

Voltage controller 140 calculates DC voltage VDC=EP+EN by adding up DC voltages EP and EN indicated by output signals EPf and ENf from voltage detectors 111 and 112, and generates current command value Ic1 in accordance with difference $\Delta VDC=VDCr-VDC$ between reference voltage VDCr and DC voltage VDC.

PWM unit 141 compares voltage command value Vc1 with a positive carrier signal and a negative carrier signal, and generates PWM signals P1X to P4X for controlling respective IGBT elements Q1X to Q4X based on a result of comparison.

The positive carrier signal varies like a triangular wave at a switching frequency between the reference voltage (0 V) and the positive voltage (+Va). The negative carrier signal varies like a triangular wave at a switching frequency between a negative voltage (-Va) and the reference voltage (0 V). Voltage command value Vc1 varies like a sinusoidal wave at the commercial frequency within a range between the positive voltage (+Va) and the negative voltage (-Va).

PWM unit 142 compares voltage command value Vc2 with the positive carrier signal and the negative carrier signal, and generates PWM signals P1Y to P4Y for controlling respective IGBT elements Q1Y to Q4Y based on a result of comparison.

PWM unit 143 compares voltage command value Vc3 with the positive carrier signal and the negative carrier signal, and generates PWM signals P1Z to P4Z for controlling respective IGBT elements Q1Z to Q4Z based on a result of comparison.

When switch circuit 134 (FIG. 22) selects PWM signal $\phi132$, gate drive circuit 135 generates gate signals G1X to G4X, G1Y to G4Y, and G1Z to G4Z in accordance with PWM signals P1X to P4X, PLY to P4Y, and P1Z to P4Z. Gate signals G1 to G4 are provided across the gates and the emitters of IGBT elements Q1 to Q4, respectively. As gate signals G1 to G4 are set to the "H" level, IGBT elements Q1 to Q4 are turned on, and when gate signals G1 to G4 are set to the "L" level, IGBT elements Q1 to Q4 are turned off.

Figure 24:
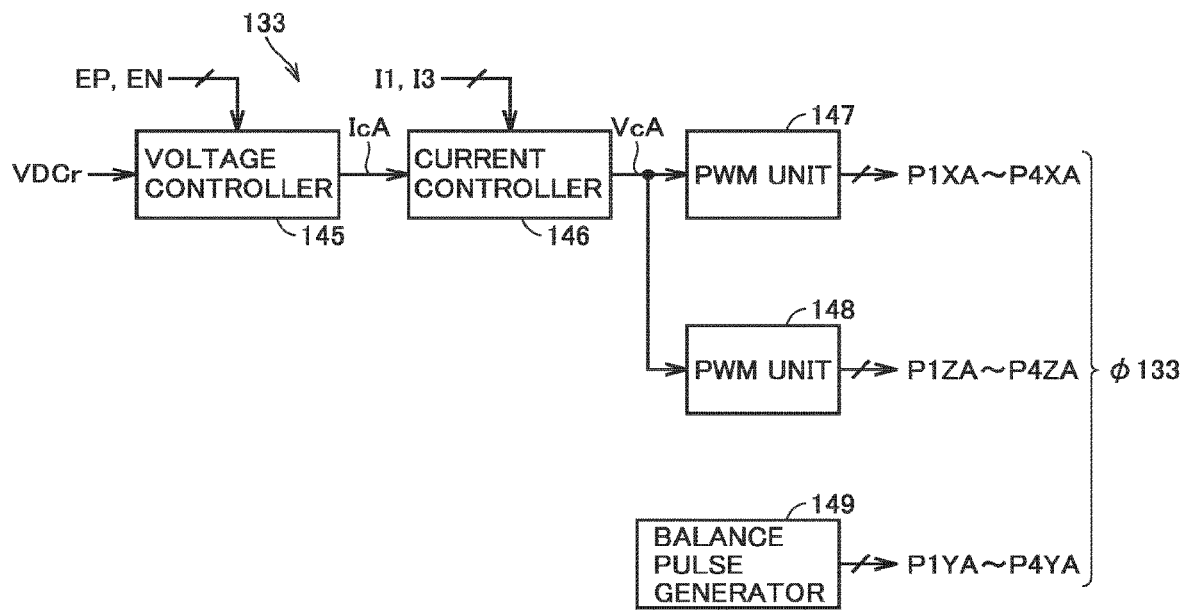
FIG. 24 is a block diagram showing a configuration of a controller 133 shown in FIG. 23.

FIG. 24 is a block diagram showing a configuration of controller 133 (FIG. 22). In FIG. 24, controller 133 includes a voltage controller 145, a current controller 146, PWM units 147 and 148, and a balance pulse generator 149.

Voltage controller 145 calculates DC voltage VDC=EP+EN by adding up DC voltages EP and EN indicated by output signals EPf and ENf from respective voltage detectors 111 and 112, and generates current command value IcA in accordance with difference $\Delta VDC=VDCr-VDC$ between reference voltage VDCr and DC voltage VDC. Current controller 146 generates DC voltage command value VcA based on current command value IcA and currents I1 and I3 indicated by output signal Iif from current detector 5.

PWM unit 147 compares voltage command value VcA with the first positive carrier signal that varies like a triangular wave at a switching frequency, and generates PWM signals P1XA to P4XA for controlling respective IGBT elements Q1X to Q4X based on a result of comparison. When a balance detection signal DT3 is at the "H" level, PWM signals P1XA to P4XA are maintained at the "L" level and IGBT elements Q1X to Q4X are maintained in the off state.

PWM unit 148 compares voltage command value VcA with the second positive carrier signal that varies like a triangular wave at a switching frequency, and generates PWM signals P1ZA to P4ZA for controlling respective IGBT elements Q1Z to Q4Z based on a result of comparison. When balance detection signal DT3 is at the "H" level, PWM signals P1ZA to P4ZA are maintained at the "L" level and IGBT elements Q1Z to Q4Z are maintained in the off state.

Balance pulse generator 149 generates PWM signals P1YA to P4YA for controlling respective IGBT elements Q1Y to Q4Y.

When switch circuit 134 (FIG. 22) selects PWM signal ϕ133, gate drive circuit 135 generates gate signals G1X to G4X, G1Y to G4Y, and G1Z to G4Z in accordance with PWM signals P1XA to P4XA, P1YA to P4YA, and P1ZA to P4ZA.

Figure 25:
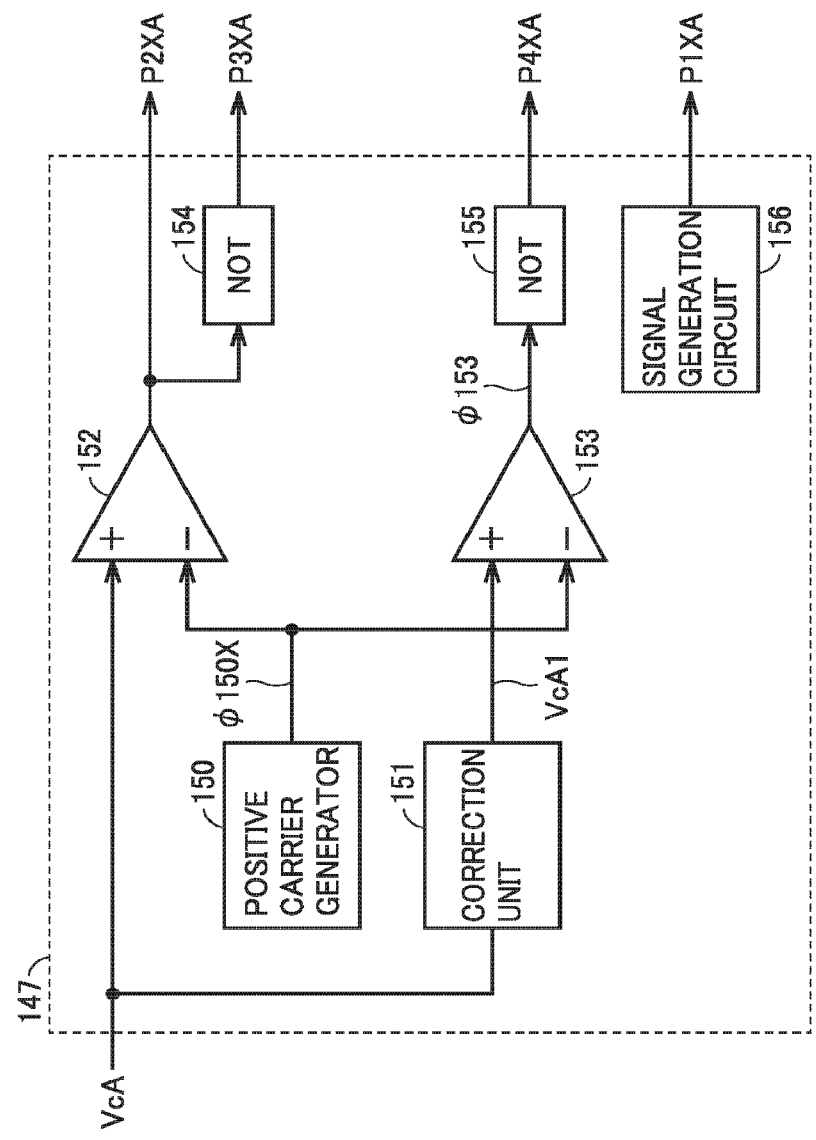
FIG. 25 is a block diagram showing a configuration of a PWM unit 147 shown in FIG. 24.

FIG. 25 is a circuit block diagram showing a configuration of PWM unit 147. In FIG. 25, PWM unit 147 includes a positive carrier generator 150, a correction unit 151, comparators 152 and 153, inversion circuits 154 and 155, and a signal generation circuit 156.

Positive carrier generator 150 generates a positive carrier signal ϕ150X. Positive carrier signal ϕ150X varies like a triangular wave at a certain frequency between the reference voltage (0 V) and a positive voltage (+Vb). Correction unit 151 generates a voltage command value VcA1 by correcting voltage command value VcA. Voltage command value VcA is a DC voltage between the reference voltage (0) and the positive voltage (+Vb). Voltage command value VcA1 is set to a value larger than voltage command value VcA.

Voltage command values VcA and VcA1 are provided to non-inverting input terminals (+ terminals) of respective comparators 152 and 153. Positive carrier signal ϕ150X is provided to inverting input terminals (− terminals) of respective comparators 152 and 153.

Comparator 152 compares magnitude of voltage command value VcA with magnitude of positive carrier signal ϕ150X, and outputs a signal indicating a result of comparison as PWM signal P2XA. Inversion circuit 154 inverts PWM signal P2XA to output PWM signal P3XA.

When the level of voltage command value VcA is higher than the level of positive carrier signal ϕ150X, PWM signals P2XA and P3XA are set to the "H" level and the "L" level, respectively. When the level of voltage command value VcA is lower than the level of positive carrier signal ϕ150X, PWM signals P2XA and P3XA are set to the "L" level and the "H" level, respectively.

Comparator 153 compares magnitude of voltage command value VcA1 with magnitude of positive carrier signal ϕ150X, and outputs a signal ϕ153 indicating a result of comparison. Inversion circuit 155 inverts signal ϕ153 to output PWM signal P4XA.

When the level of voltage command value VcA1 is higher than the level of positive carrier signal ϕ150X, PWM signal P4XA is set to the "L" level. When the level of voltage command value VcA1 is lower than the level of positive carrier signal ϕ150X, PWM signal P4XA is set to the "H" level. Signal generation circuit 156 outputs PWM signal P1XA at the "L" level.

When PWM signals P3XA and P4XA and PWM signal P2XA are alternately set to the "H" level and when power failure detection signal DT1 is at the "L" level, IGBT elements Q3X and Q4X are turned on and off in certain cycles and the boosting operation is performed.

As IGBT elements Q3X and Q4X are turned off, diodes D2X and D1X are turned on. Therefore, even when PWM signal P2XA is set to the "H" level, IGBT element Q2X is not turned on.

An effect of correction unit 151 will now be described. In the absence of correction unit 151, a waveform of PWM signal P3XA and a waveform of PWM signal P4XA are identical to each other, and ideally, IGBT elements Q3X and Q4X are simultaneously switched.

Actually, however, due to variation in characteristics of IGBT elements, even when PWM signals P3XA and P4XA are identical in waveform, IGBT elements Q3X and Q4X may be switched at different timings.

For example, when IGBT element Q4X is turned on earlier than IGBT element Q3X or turned off later than IGBT element Q3X, DC voltage VDC is applied to IGBT element Q3X, which may be broken by an overvoltage.

Correction unit 151 generates voltage command value Vc1A higher than voltage command value Vc1. Thus, even when IGBT elements are varied in characteristics, IGBT element Q4X is turned on later than IGBT element Q3X and turned off earlier than IGBT element Q3X. Thus, a mode in which clamp diodes D6X and D5X are turned on can be ensured, and IGBT element Q3X can be prevented from being broken by an overvoltage.

Since the configuration and operations of PWM unit 148 are similar to those of PWM unit 147, description thereof will not be repeated. Positive carrier signal ϕ150X generated in PWM unit 147 and a positive carrier signal ϕ150Z generated in PWM unit 148, however, are 180-degree out of phase with each other.

Therefore, since PWM signals P1XA to P4XA and PWM signals P1ZA to P4ZA are 180-degree out of phase with each other, diodes D2X and D1X and diodes D2Z and D1Z are turned on at different timings in the boosting operation, and a ripple voltage caused in DC voltage VDC is suppressed.

Figure 26:
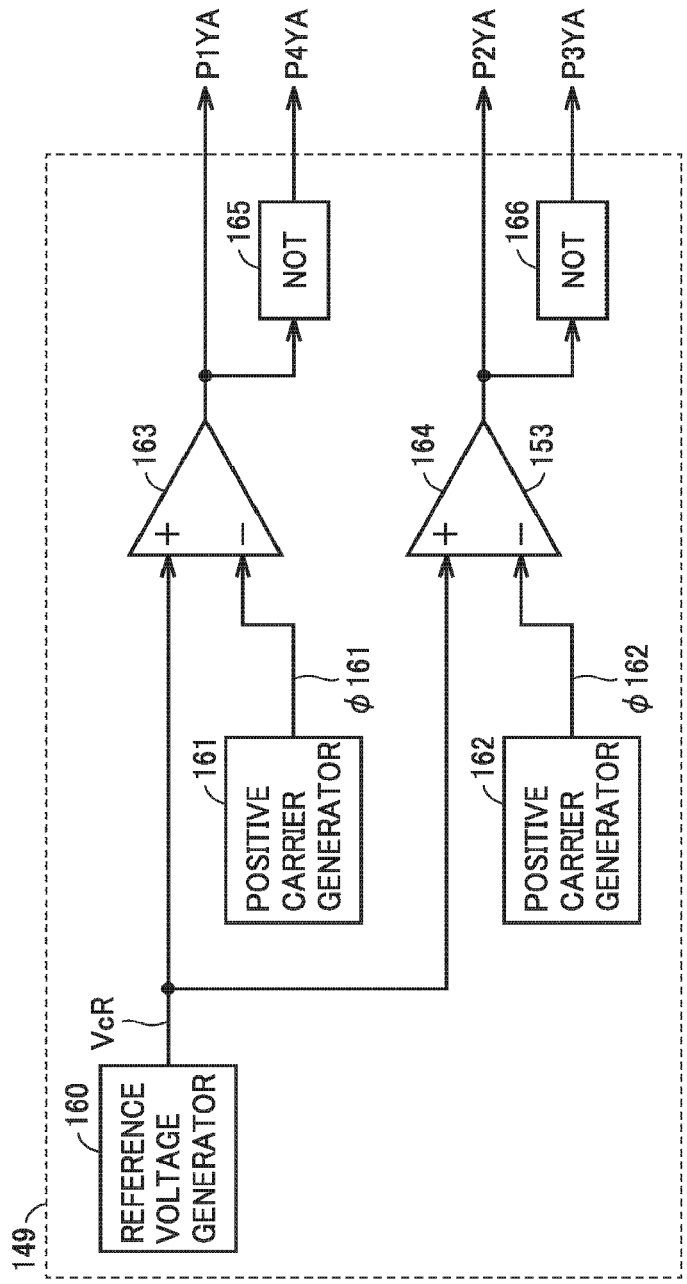
FIG. 26 is a block diagram showing a configuration of a balance pulse generator shown in FIG. 24.

FIG. 26 is a circuit block diagram showing a configuration of balance pulse generator 149 (FIG. 24). In FIG. 26, balance pulse generator 149 includes a reference voltage generator 160, positive carrier generators 161 and 162, comparators 163 and 164, and inversion circuits 165 and 166. Reference voltage generator 160 generates a reference voltage VcR=Vb/2 which is intermediate between the reference voltage (0 V) and the positive voltage (+Vb).

Positive carrier generator 161 generates a positive carrier signal ϕ161. Positive carrier signal ϕ161 varies like a triangular wave at a certain frequency between the reference voltage (0 V) and the positive voltage (+Vb). Positive carrier generator 162 generates positive carrier signal ϕ162. Positive carrier signal ϕ162 varies like a triangular wave at a certain frequency between the reference voltage (0 V) and the positive voltage (+Vb). A phase of positive carrier signal ø161 is advanced by a certain time period Tc as compared with a phase of positive carrier signal ϕ162.

Reference voltage VcR is provided to non-inverting input terminals (+ terminals) of respective comparators 163 and 164. Positive carrier signals ϕ161 and ϕ162 are provided to inverting input terminals (− terminals) of respective comparators 163 and 164.

Comparator 163 compares magnitude of reference voltage VcR with magnitude of positive carrier signal ø161 and outputs a signal indicating a result of comparison as PWM signal P1YA. Inversion circuit 165 inverts PWM signal P1YA to output PWM signal P4YA.

When the level of reference voltage VcR is higher than the level of positive carrier signal ϕ161, PWM signals P1YA and P4YA are set to the "H" level and the "L" level, respectively. When the level of reference voltage VcR is lower than the level of positive carrier signal ϕ161, PWM signals P1YA and P4YA are set to the "L" level and the "H" level, respectively.

Comparator 164 compares magnitude of reference voltage VcR with magnitude of positive carrier signal ϕ162 and outputs a signal indicating a result of comparison as PWM signal P2YA. Inversion circuit 166 inverts PWM signal P2YA to output PWM signal P3YA.

When the level of reference voltage VcR is higher than the level of positive carrier signal ϕ162, PWM signals P2YA and P3YA are set to the "H" level and the "L" level, respectively. When the level of reference voltage VcR is lower than the level of positive carrier signal ϕ162, PWM signals P2YA and P3YA are set to the "L" level and the "H" level, respectively.

When PWM signals P1YA and P2YA and PWM signals P3YA and P4YA are alternately set to the "H" level and when power failure detection signal DT1 is at the "L" level, IGBT elements Q1Y and Q2Y and IGBT elements Q3Y and Q4Y are alternately turned on at a certain frequency, and the balancing operation to reduce magnitude of difference ΔE=EP−EN between voltages EP and EN across terminals of capacitors Cd1 and Cd2 is performed.

The reason why positive carrier signal ϕ161 and positive carrier signal ϕ162 are set to be out of phase with each other will now be described. Ideally, preferably, a pair of IGBT elements Q1Y and Q2Y is simultaneously switched and a pair of IGBT elements Q3Y and Q4Y is simultaneously switched.

Actually, however, even when an identical gate signal is applied across the gates and emitters of the pair of IGBT elements, due to variation in characteristics of the IGBT elements, one IGBT element of the pair of IGBT elements is turned on or off earlier than the other IGBT element. In this case, DC voltage VDC is applied to one IGBT element and that IGBT element may be broken by an overvoltage.

In the present sixth embodiment, positive carrier signals ϕ161 and ϕ162 are set to be out of phase with each other so that clamp diodes D5Y and D6Y are reliably turned on at timings of turn-on and -off of each of IGBT elements Q1Y to Q4Y to thereby shift timings of switching of IGBT elements Q1Y and Q2Y from each other and shift timings of switching of IGBT elements Q3Y and Q4Y from each other.

Figure 27:
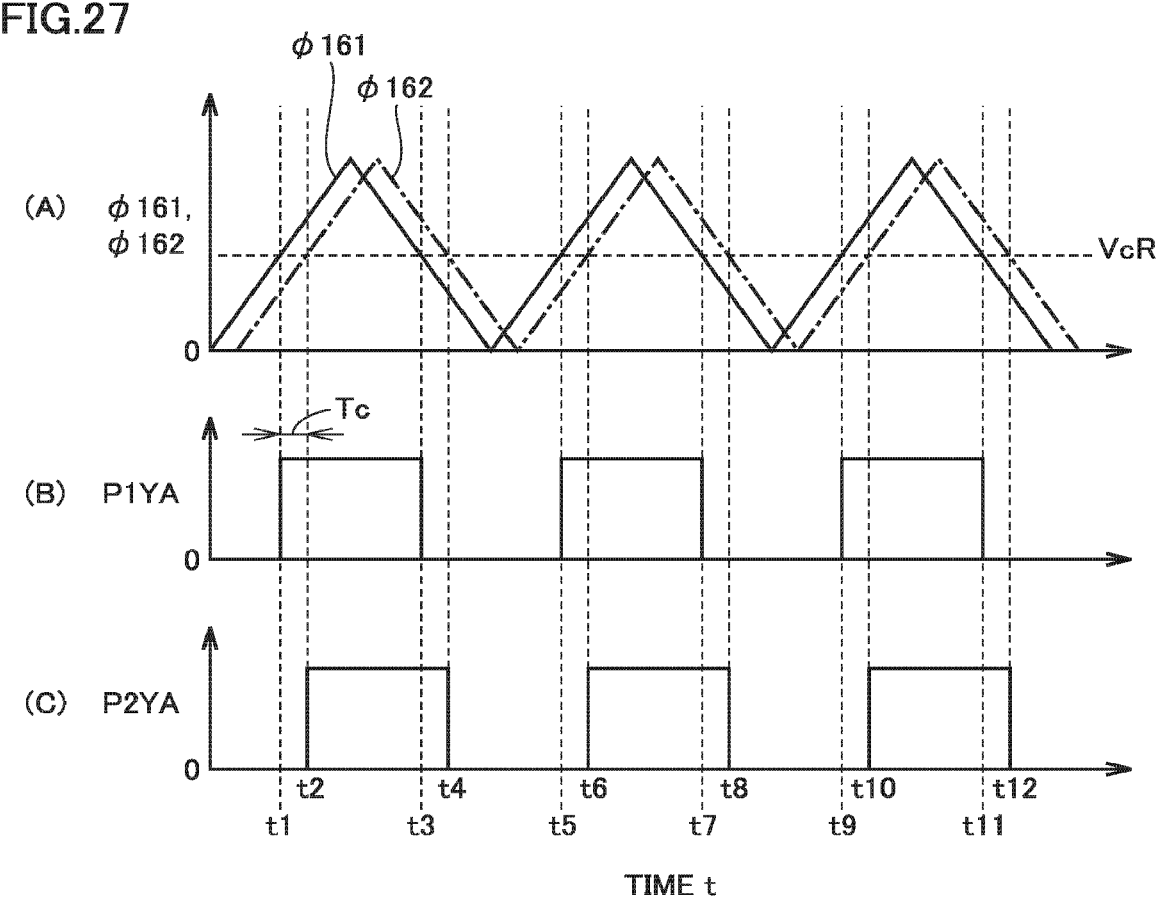
FIG. 27 is a time chart showing an operation of the balance pulse generator shown in FIG. 26.

FIG. 27 is a time chart showing an operation of balance pulse generator 149. In FIG. 27, (A) shows waveforms of positive carrier signals ϕ161 and ϕ162, (B) shows a waveform of PWM signal P1YA, and (C) shows a waveform of PWM signal P2YA.

In FIG. 27, the phase of positive carrier signal ϕ161 is advanced by certain time period Tc as compared with the phase of positive carrier signal ϕ162. When the level of positive carrier signal ϕ161 is higher than reference voltage VcR, PWM signal P1YA is set to the "H" level, and when the level of positive carrier signal ϕ161 is lower than reference voltage VcR, PWM signal P1YA is set to the "L" level.

When the level of positive carrier signal ϕ162 is higher than reference voltage VcR, PWM signal P2YA is set to the "H" level, and when the level of positive carrier signal ϕ162 is lower than reference voltage VcR, PWM signal P2YA is set to the "L" level.

The phase of PWM signal P1YA is advanced by certain time period Tc as compared with the phase of PWM signal P2YA. Therefore, IGBT element Q1Y is turned on and off earlier than IGBT element Q2Y. Therefore, for example, IGBT element Q1Y can be prevented from being broken due to turn-on of IGBT element Q2Y earlier than IGBT element Q1Y.

PWM signals P4YA and P3YA are inverted versions of PWM signals P1YA and P2YA, respectively. Therefore, the phase of PWM signal P4YA is advanced by certain time period Tc as compared with the phase of PWM signal P3YA. Therefore, IGBT element Q4Y is turned on and off earlier than IGBT element Q3Y. Therefore, for example, IGBT element Q4Y can be prevented from being broken due to turn-on of IGBT element Q3Y earlier than IGBT element Q4Y.

An operation of the uninterruptible power supply shown in FIGS. 19 to 27 will now be described. While commercial AC power supply 11 is normal, power failure detector 21 (FIG. 20) sets power failure detection signal DT1 to the "H" level which is the inactivation level, and controller 121 and drive circuit 122 (FIG. 21) turn on switches S1 to S3 and turn off switches S21 to S23. Three-phase AC voltages VR, VS, and VT are thus supplied from commercial AC power supply 11 through switches S1 to S3 to converter 101.

Switch circuit 134 (FIG. 22) selects controller 132. Reference voltage generator 131, controller 132, and gate drive circuit 135 have converter 101 (FIG. 19) operate. Three-phase AC voltages VR, VS, and VT supplied from commercial AC power supply 11 through switches S1 to S3 are converted to DC voltage VDC=EP+EN by converter 101.

Control device 104 (FIG. 19) has inverter 103 operate, and DC voltages EP and EN are converted to three-phase AC voltages VU, VV, and VW and supplied to load 12. Control device 104 has chopper circuit 4 operate, DC voltage VDC=EP+EN is down-converted and supplied to battery 13, and battery 13 is charged.

When power failure of commercial AC power supply 11 occurs, power failure detector 21 (FIG. 20) sets power failure detection signal DT1 to the "L" level which is the activation level, and controller 121 and drive circuit 122 (FIG. 21) turn off switches S1 to S3 and turn on switches S21 to S23. DC voltage VB of battery 13 is thus supplied through switches S21 and S22 to leg circuits 101a and 101c of converter 101. Control device 104 stops the operation of chopper circuit 4.

Switch circuit 134 (FIG. 22) selects controller 133. Reference voltage generator 131, controller 133, and gate drive circuit 135 have leg circuits 101a and 101c of converter 101 operate. DC voltage VB supplied from battery 13 through switches S21 and S22 is boosted by leg circuits 101a and 101c of converter 101 and converted to DC voltage VDC=EP+EN.

Balance pulse generator 149 (FIG. 24) has leg circuit 101b operate to decrease magnitude of a difference ΔE=EP−EN between DC voltages EP and EN.

Control device 104 (FIG. 19) has inverter 103 operate, and DC voltages EP and EN are converted to three-phase AC voltages VU, VV, and VW and supplied to load 12. Therefore, even when commercial AC power supply 11 fails, the operation of load 12 can continue during a period during which there is DC power stored in battery 13.

As set forth above, in this sixth embodiment, converter 101 is controlled to perform the boosting operation to supply DC power in battery 13 to inverter 103 during power failure of commercial AC power supply 11, and chopper circuit 4 is controlled to perform a charging operation to store in battery 13, DC power from converter 101 while commercial AC power supply 11 is normal. Therefore, as compared with a conventional example where the chopper circuit is controlled to perform both of the boosting operation and the charging operation, chopper circuit 4 can be reduced in size and hence the uninterruptible power supply can be reduced in size.

By shifting timings of turn-on and -off of IGBT elements Q3X and Q4X and timings of turn-on and -off of IGBT elements Q3Z and Q4Z from each other by ½ of one cycle during power failure of commercial AC power supply 11, timings of flow of a current from battery 13 through leg circuits 101a and 101c to capacitors Cd1 and Cd2 are shifted by ½ of one cycle from each other, so that an amplitude of a ripple voltage superimposed on DC voltage VDC can be suppressed.

By alternately turning on IGBT elements Q1Y and Q2Y and IGBT elements Q3Y and Q4Y during power failure of commercial AC power supply 11, difference ΔE=EP-EN between voltages EP and EN across terminals of capacitors Cd1 and Cd2 can be decreased.

In an example where AC power of the first phase to the Mth phase is supplied from the commercial AC power supply, by driving (M−1) leg circuits corresponding to the first to (M−1)th phases during the boosting operation and driving a leg circuit corresponding to the Mth phase during the balancing operation, an effect the same as in the present sixth embodiment is obtained. M is an integer equal to or larger than two. In the present sixth embodiment, M is set to three, the R phase and the T phase are defined as the first and second phases, respectively, and the S phase is defined as the third phase.

Though switch S23 is constantly set to on to have leg circuit 101b perform the balancing operation during power failure of commercial AC power supply 11 in the present sixth embodiment, without being limited as such, switch S23 may be turned on to have leg circuit 101b perform the balancing operation only when magnitude of difference ΔE=EP-EN between voltages EP and EN across terminals of capacitors Cd1 and Cd2 exceeds an upper limit value ΔEH. Furthermore, when magnitude of ΔE exceeds upper limit value ΔEH, switches S21 and S22 may be turned off to stop the boosting operation by leg circuits 101a and 101c.

Seventh Embodiment

Figure 28:
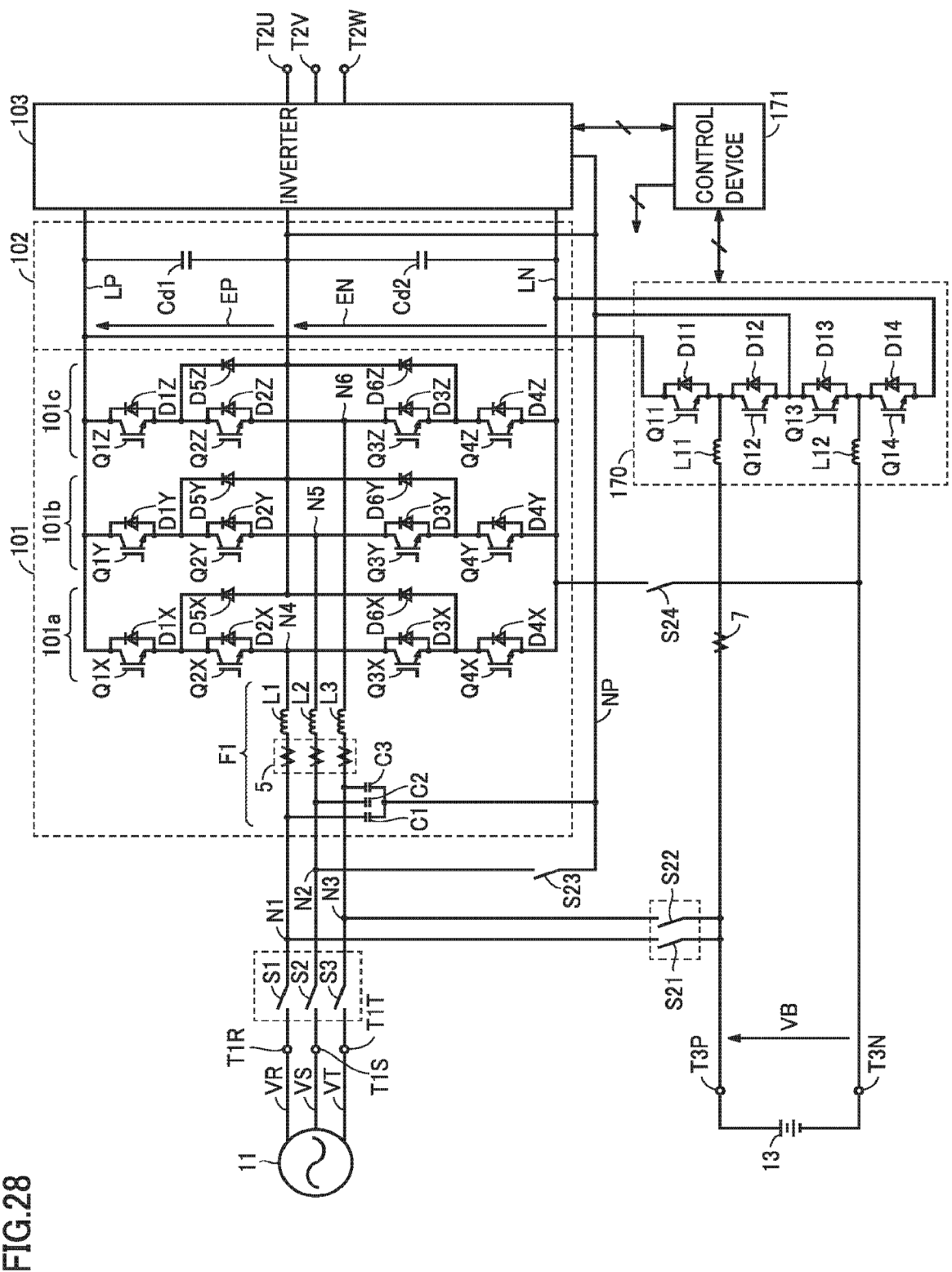
FIG. 28 is a circuit block diagram showing a configuration of an uninterruptible power supply according to a seventh embodiment.

FIG. 28 is a circuit block diagram showing a configuration of an uninterruptible power supply according to a seventh embodiment, which is to be compared with FIG. 19. Referring to FIG. 28, this uninterruptible power supply is different from the uninterruptible power supply in FIG. 19 in that a switch S24 is added and chopper circuit 4 and control device 104 are replaced with a chopper circuit 170 and a control device 171, respectively.

Switch S24 is connected between DC line LN and battery terminal T3N and controlled by control device 171. While commercial AC power supply 11 is normal, switch S24 is turned off. During power failure of commercial AC power supply 11, switch S24 is turned on. Switch S24 corresponds to one embodiment of the "second switch" connected between second DC line LN and the negative electrode of the power storage device (battery 13).

Chopper circuit 170 is controlled by control device 171, and while commercial AC power supply 11 is normal, chopper circuit 170 allows DC power generated by converter 1 to be stored in battery 13. Current detector 7 detects current IB that flows between chopper circuit 170 and battery 13, and provides signal IBf indicating a detection value thereof to control device 171. Control device 171 controls chopper circuit 170 such that battery voltage VB attains to reference voltage VBr based on battery voltage VB and current IB.

Specifically, chopper circuit 170 includes IGBT elements Q11 to Q14, diodes D11 to D14, and reactors L11 and L12. IGBT elements Q11 to Q14 are connected in series between DC lines LP and LN. Diodes D11 to D14 are connected in anti-parallel to IGBT elements Q11 to Q14, respectively.

Reactor L11 has one terminal connected to an emitter of IGBT element Q11 and has the other terminal connected to battery terminal T3P. Reactor L12 has one terminal connected to battery terminal T3N and has the other terminal connected to an emitter of IGBT element Q13. IGBT element Q12 has an emitter connected to neutral point NP.

Control device 171 alternately turns on IGBT elements Q11 and Q14 at a certain frequency while commercial AC power supply 11 is normal. As IGBT element Q11 is turned on, a current flows from the positive electrode of capacitor Cd1 through DC line LP, IGBT element Q11, reactor L7, battery 13, reactor L12, diode D13, and neutral point NP to the negative electrode of capacitor Cd1, so that battery 13 is charged and electromagnetic energy is stored in reactors L11 and L12.

As IGBT element Q14 is turned on, a current flows from the positive electrode of capacitor Cd2 through neutral point NP, diode D12, reactor L11, battery 13, reactor L12, IGBT element Q14, and DC line NL to the negative electrode of capacitor Cd2, so that battery 13 is charged and electromagnetic energy is stored in reactors L11 and L12.

As IGBT element Q11 or Q14 is turned off, a current flows through a path of reactor L11, battery 13, reactor L12, and diodes D13 and D14, so that electromagnetic energy in reactors L11 and L12 is emitted and battery 13 is charged. As battery voltage VB reaches reference voltage VBr, control device 171 maintains IGBT elements Q11 and Q14 in the off state.

When commercial AC power supply 11 fails, control device 171 turns off switches S1 to S3 and turns on switches S21 to S24 to thereby couple battery 13 and converter 101 to each other. As in the sixth embodiment, control device 171 controls leg circuits 101a and 101c of converter 101 to perform the boosting operation.

As in the sixth embodiment, control device 171 controls leg circuit 101b of converter 101 to perform the balancing operation. Since the configuration and the operations are otherwise the same as in the sixth embodiment, description thereof will not be repeated.

This seventh embodiment can achieve effects the same as those in the sixth embodiment and can achieve reduction in size of reactors L11 and L12 of chopper circuit 170.

As shown in the second and third embodiments, DC power in battery 13 can also be supplied to capacitors Cd1 and Cd2. In this case, control device 171 alternately turns on IGBT elements Q12 and Q13 at a certain frequency.

As IGBT element Q12 is turned on, a current flows from the positive electrode of battery 13 through reactor L11, IGBT element Q12, neutral point NP, capacitor Cd2, DC line LN, and diode D14 to the negative electrode of battery 13, so that capacitor Cd2 is charged and electromagnetic energy is stored in reactors L11 and L12.

As IGBT element Q13 is turned on, a current flows from the positive electrode of battery 13 through reactor L11, diode D11, DC line LP, capacitor Cd1, neutral point NP, IGBT element Q13, and reactor L12 to the negative electrode of battery 13, so that capacitor Cd1 is charged and electromagnetic energy is stored in reactors L11 and L12.

As IGBT element Q12 or Q13 is turned off, a current flows through a path of the positive electrode of battery 13, reactor L11, diode D11, DC line LP, capacitors Cd1 and Cd2, DC line LN, diode D14, and the negative electrode of battery 13, so that capacitors Cd1 and Cd2 are charged and electromagnetic energy in reactors L11 and L12 is emitted. As DC voltage VDC reaches reference voltage VDCr, control device 171 maintains IGBT elements Q12 and Q13 in the off state.

It should be understood that the embodiments disclosed herein are illustrative and non-restrictive in every respect. The technical scope shown in the present disclosure is defined by the terms of the claims rather than the description of the embodiments above and is intended to include any modifications within the scope and meaning equivalent to the terms of the claims.

REFERENCE SIGNS LIST

T1R, T1S, T1T AC input terminal; T2U, T2V, T2W AC output terminal; T3P, T3N battery terminal; S1 to S6, S11 to S19, S21 to S24 switch; 1, 101 converter; 1a to 1c, 3a to 3c, 101a to 101c leg circuit; 2, 102 DC link portion; 3, 103 inverter; 4, 170 chopper circuit; 5 to 7 current detector; 8, 8A, 8B, 104, 171 control device; 9 processing apparatus; 11 commercial AC power supply; 12 load; 13 battery; F1, F2 AC filter; C1 to C6, Cd, Cd1, Cd2 capacitor; L1 to L7, L11, L12 reactor; Q1 to Q6, Q11 to Q14 IGBT element; D1 to D6, D11 to D14 diode; 20, 22 to 24, 111, 112 voltage detector; 25, 113 control circuit; B1 to B7, B11 to B14 control block; 26, 31, 32, 76, 81, 83, 95, 121, 132, 133 controller; 27, 122 drive circuit; 30, 75, 80, 131, 160 reference voltage generator; 33, 85, 96, 134 switch circuit; 34, 77, 82, 91, 97, 135 gate drive circuit; 40, 60, 140, 145 voltage controller; 41 to 43, 61, 146 current controller; 44 to 46, 62 to 64, 141 to 143, 147, 148 PWM unit; 50 bipolar carrier generator; 51, 71, 152, 153, 163, 164 comparator; 52, 72, 154, 155, 165, 166 inversion circuit; 70, 150, 161, 162 positive carrier generator; 84 overload detector; 90, 156 signal generation circuit; R1 to R3 resistor; 149 balance pulse generator; 151 correction unit

The invention claimed is:

1. An uninterruptible power supply comprising:
a power supply terminal that receives AC power supplied from an AC power supply while the AC power supply is normal;
a first switch connected between a power storage device and the power supply terminal, the first switch being turned off while the AC power supply is normal and turned on during power failure of the AC power supply;
a DC link portion for supply and reception of DC power;
a converter that converts AC power supplied from the AC power supply to the power supply terminal into DC power to supply resultant DC power to the DC link portion while the AC power supply is normal, and that supplies to the DC link portion, DC power supplied from the power storage device through the first switch to the power supply terminal during power failure of the AC power supply;
an inverter that converts DC power from the DC link portion into AC power to supply resultant AC power to a load; and
a chopper circuit that allows DC power from the DC link portion to be stored in the power storage device while the AC power supply is normal, wherein
the DC link portion includes
first and second DC lines, and
a first capacitor connected between the first and second DC lines, the converter includes a leg circuit and an AC filter,
the leg circuit includes
a first switching element connected between the first DC line and an intermediate terminal,
a second switching element connected between the intermediate terminal and the second DC line, and
first and second diodes connected in anti-parallel to the first and second switching elements, respectively,
the AC filter includes
a second capacitor connected between the power supply terminal and a neutral point, and
a reactor connected between the power supply terminal and the intermediate terminal,
the AC power supply supplies AC power of first to Mth phases different in phase from one another, M being an integer equal to or larger than two, and
the power supply terminal, the leg circuit, and the AC filter are provided in correspondence with AC power of each of the first to Mth phases,
the first capacitor includes
a first sub capacitor connected between the first DC line and the neutral point, and
a second sub capacitor connected between the neutral point and the second DC line,
the first switch is provided in correspondence with AC power of each of the first to an (M−1)th phases,
the uninterruptible power supply further comprises a second switch connected between the power supply terminal corresponding to AC power of the Mth phase and the neutral point, the second switch being turned off while the AC power supply is normal and turned on during power failure of the AC power supply,
during power failure of the AC power supply, the second switching element in the leg circuit corresponding to each of the first to (M−1)th phases is turned on and off such that a DC voltage between the first and second DC lines attains to a reference voltage, and
during power failure of the AC power supply, the first and second switching elements in the leg circuit corresponding to the Mth phase are alternately turned on such that the first and second sub capacitors are equal to each other in voltage across terminals.

2. The uninterruptible power supply according to claim 1, wherein
the converter boosts a DC voltage supplied from the power storage device through the first switch to the power supply terminal to supply the boosted DC voltage to the DC link portion during power failure of the AC power supply, and
the chopper circuit down-converts a DC voltage from the DC link portion to supply the down-converted DC voltage to the power storage device while the AC power supply is normal.

3. The uninterruptible power supply according to claim 1, wherein
the chopper circuit is connected between the first and second DC lines and a positive electrode and a negative electrode of the power storage device,
the first switch is connected between the positive electrode of the power storage device and the corresponding power supply terminal, and
the second DC line and the negative electrode of the power storage device are short-circuited to each other.

4. The uninterruptible power supply according to claim 1, wherein
the chopper circuit supplies DC power in the power storage device to the DC link portion when a load current exceeds an upper limit value even while the AC power supply is normal.

5. The uninterruptible power supply according to claim 1, further comprising a third switch connected between the AC power supply and the power supply terminal, the third switch being turned on while the AC power supply is normal and turned off during power failure of the AC power supply.

6. The uninterruptible power supply according to claim 5, wherein
the chopper circuit supplies DC power in the power storage device to the DC link portion for a predetermined time period after occurrence of power failure of the AC power supply, and
the converter supplies to the DC link portion, DC power supplied from the power storage device through the first switch to the power supply terminal after the first switch is turned on and the third switch is turned off.

7. The uninterruptible power supply according to claim 1, further comprising a third switch and a resistor connected in series between the power storage device and the power supply terminal, wherein
the third switch is turned on for a predetermined time period after occurrence of power failure of the AC power supply, and
the first switch is turned on after the third switch is turned off.

8. The uninterruptible power supply according to claim 1, wherein
the first switch has one terminal connected to the power storage device, and
the uninterruptible power supply further comprises:
a resistor connected between the other terminal of the first switch and the power supply terminal; and
a third switch connected in parallel to the resistor and turned on after lapse of a predetermined time period since occurrence of power failure of the AC power supply.

9. An uninterruptible power supply comprising:
a power supply terminal that receives AC power supplied from an AC power supply while the AC power supply is normal;
a first switch connected between a power storage device and the power supply terminal, the first switch being turned off while the AC power supply is normal and turned on during power failure of the AC power supply;
a DC link portion for supply and reception of DC power;
a converter that converts AC power supplied from the AC power supply to the power supply terminal into DC power to supply resultant DC power to the DC link portion while the AC power supply is normal, and that supplies to the DC link portion, DC power supplied from the power storage device through the first switch to the power supply terminal during power failure of the AC power supply;
an inverter that converts DC power from the DC link portion into AC power to supply resultant AC power to a load; and
a chopper circuit that allows DC power from the DC link portion to be stored in the power storage device while the AC power supply is normal, wherein
the DC link portion includes
first and second DC lines, and
a first capacitor connected between the first and second DC lines, the converter includes a leg circuit and an AC filter,
the leg circuit includes
a first switching element connected between the first DC line and an intermediate terminal,
a second switching element connected between the intermediate terminal and the second DC line, and
first and second diodes connected in anti-parallel to the first and second switching elements, respectively,
the AC filter includes
a second capacitor connected between the power supply terminal and a neutral point, and
a reactor connected between the power supply terminal and the intermediate terminal,
the AC power supply supplies AC power of first to Mth phases different in phase from one another, M being an integer equal to or larger than two, and
the power supply terminal, the leg circuit, and the AC filter are provided in correspondence with AC power of each of the first to Mth phases,
the first capacitor includes
a first sub capacitor connected between the first DC line and the neutral point, and
a second sub capacitor connected between the neutral point and the second DC line,
the chopper circuit is connected between the first DC line, the second DC line and the neutral point, and a positive electrode and a negative electrode of the power storage device,
the first switch is connected between the positive electrode of the power storage device and the corresponding power supply terminal, and
the uninterruptible power supply further comprises a second switch connected between the second DC line and the negative electrode of the power storage device, the second switch being turned off while the AC power supply is normal and turned on during power failure of the AC power supply.

10. The uninterruptible power supply according to claim 9, wherein
the converter boosts a DC voltage supplied from the power storage device through the first switch to the power supply terminal to supply the boosted DC voltage to the DC link portion during power failure of the AC power supply, and
the chopper circuit down-converts a DC voltage from the DC link portion to supply the down-converted DC voltage to the power storage device while the AC power supply is normal.

11. The uninterruptible power supply according to claim 9, wherein the chopper circuit supplies DC power in the power storage device to the DC link portion when a load current exceeds an upper limit value even while the AC power supply is normal.

12. The uninterruptible power supply according to claim 9, further comprising a third switch connected between the AC power supply and the power supply terminal, the third switch being turned on while the AC power supply is normal and turned off during power failure of the AC power supply.

13. The uninterruptible power supply according to claim 12, wherein
the chopper circuit supplies DC power in the power storage device to the DC link portion for a predetermined time period after occurrence of power failure of the AC power supply, and
the converter supplies to the DC link portion, DC power supplied from the power storage device through the first switch to the power supply terminal after the first switch is turned on and the third switch is turned off.

14. The uninterruptible power supply according to claim 9, further comprising a third switch and a resistor connected in series between the power storage device and the power supply terminal, wherein
the third switch is turned on for a predetermined time period after occurrence of power failure of the AC power supply, and
the first switch is turned on after the third switch is turned off.

15. The uninterruptible power supply according to claim 9, wherein
the first switch has one terminal connected to the power storage device, and
the uninterruptible power supply further comprises:
a resistor connected between the other terminal of the first switch and the power supply terminal; and
a third switch connected in parallel to the resistor and turned on after lapse of a predetermined time period since occurrence of power failure of the AC power supply.

* * * * *